US007660902B2

(12) United States Patent
Graham et al.

(10) Patent No.: US 7,660,902 B2
(45) Date of Patent: Feb. 9, 2010

(54) DYNAMIC FILE ACCESS CONTROL AND MANAGEMENT

(75) Inventors: Todd D. Graham, Ann Arbor, MI (US); Jonathan C. Hudson, Grosse Pointe Farms, MI (US)

(73) Assignee: RSA Security, Inc., Bedford, MA (US)

( * ) Notice: Subject to any disclaimer, the term of this patent is extended or adjusted under 35 U.S.C. 154(b) by 312 days.

(21) Appl. No.: 09/989,479

(22) Filed: Nov. 20, 2001

(65) Prior Publication Data
US 2002/0178271 A1 Nov. 28, 2002

Related U.S. Application Data

(63) Continuation-in-part of application No. 09/717,474, filed on Nov. 20, 2000.

(51) Int. Cl.
G06F 15/16 (2006.01)
(52) U.S. Cl. .................. 709/229; 709/203; 709/217; 709/219; 710/9; 710/10
(58) Field of Classification Search ......... 709/227–229, 709/203, 217, 219; 707/9, 10
See application file for complete search history.

(56) References Cited

U.S. PATENT DOCUMENTS

| 5,689,566 | A |   | 11/1997 | Nguyen ..................... 380/25 |
| 5,694,546 | A |   | 12/1997 | Reisman ................. 395/200.9 |
| 5,715,403 | A | * | 2/1998  | Stefik ....................... 709/229 |
| 5,719,786 | A |   | 2/1998  | Nelson ..................... 364/514 |
| 5,729,594 | A |   | 3/1998  | Klingman ................ 379/93.12 |
| 5,737,635 | A |   | 4/1998  | Daines ..................... 395/872 |
| 5,742,685 | A |   | 4/1998  | Berson ...................... 380/25 |
| 5,765,152 | A |   | 6/1998  | Erickson |
| 5,802,178 | A | * | 9/1998  | Holden et al. ............. 713/151 |
| 5,815,502 | A |   | 9/1998  | Saito et al. ................ 370/468 |
| 5,815,665 | A |   | 9/1998  | Teper .................... 395/200.59 |
| 5,830,609 | A |   | 11/1998 | Warner ...................... 430/10 |
| 5,832,300 | A |   | 11/1998 | Lowthert .................. 395/835 |
| 5,856,266 | A |   | 1/1999  | Gasper ..................... 503/206 |
| 5,864,667 | A |   | 1/1999  | Barkan ................. 395/187.01 |
| 5,870,474 | A |   | 2/1999  | Wasilewski ................ 380/21 |
| 5,884,246 | A |   | 3/1999  | Boucher ...................... 704/2 |
| 5,898,830 | A |   | 4/1999  | Wesinger ............. 395/187.01 |
| 5,903,775 | A |   | 5/1999  | Murray .................... 395/853 |
| 5,920,861 | A | * | 7/1999  | Hall et al. ..................... 707/9 |
| 5,933,497 | A |   | 8/1999  | Beetcher ...................... 380/4 |
| 5,933,816 | A |   | 8/1999  | Zeanah ..................... 705/35 |
| 5,935,246 | A |   | 8/1999  | Benson .................... 713/200 |
| 5,940,516 | A |   | 8/1999  | Mason ....................... 380/49 |
| 5,941,947 | A |   | 8/1999  | Brown et al. |
| 5,960,086 | A |   | 9/1999  | Attalla ...................... 380/44 |
| 5,963,909 | A |   | 10/1999 | Warren ....................... 705/1 |
| 5,963,915 | A |   | 10/1999 | Kirsch ...................... 705/26 |

(Continued)

Primary Examiner—Dohm Chankong
(74) Attorney, Agent, or Firm—BainwoodHuang

(57) ABSTRACT

A dynamic file access control and management system and method in accordance with the present invention may be a proxy file management system that includes one or more file system proxy servers that provide selective access and usage management to files available from one or more file systems or sources. The present invention may embody a secure transport protocol that tunnels distributed file systems, application independent usage controls connected to files on end-user computers, dynamically merging secondary content to a requested file, and applying bandwidth management to any of the foregoing. Embodied in the various implementations of the present invention is enhanced file security. Preferably, the proxy file management system is transparent to an end-user. A dynamic content management system may also be included that selectively adds content to requested files.

20 Claims, 23 Drawing Sheets

U.S. PATENT DOCUMENTS

| | | | |
|---|---|---|---|
| 5,982,891 A | 11/1999 | Ginter | 380/4 |
| 5,991,372 A | 11/1999 | Davenport | 379/91.02 |
| 5,991,499 A | 11/1999 | Yagasaki | 386/94 |
| 5,999,978 A | 12/1999 | Angal et al. | |
| 6,006,332 A * | 12/1999 | Rabne et al. | 709/229 |
| 6,012,071 A | 1/2000 | Krishna | 707/522 |
| 6,012,144 A | 1/2000 | Pickett | 713/201 |
| 6,014,650 A | 1/2000 | Zampese | 705/44 |
| 6,016,491 A | 1/2000 | Kou | 707/9 |
| 6,018,724 A | 1/2000 | Arent | 705/44 |
| 6,023,509 A | 2/2000 | Herbert | 380/25 |
| 6,041,411 A | 3/2000 | Wyatt | 713/200 |
| 6,049,612 A | 4/2000 | Fielder | 380/44 |
| 6,055,314 A | 4/2000 | Spies | 308/21 |
| 6,055,575 A | 4/2000 | Paulsen | 709/229 |
| 6,061,448 A | 5/2000 | Smith | 380/21 |
| 6,067,620 A | 5/2000 | Holden | 713/155 |
| 6,073,123 A | 6/2000 | Staley | 705/58 |
| 6,073,124 A | 6/2000 | Krishnan | 705/59 |
| 6,105,027 A * | 8/2000 | Schneider et al. | 707/9 |
| 6,105,069 A * | 8/2000 | Franklin et al. | 709/229 |
| 6,108,787 A | 8/2000 | Anderson | 713/201 |
| 6,199,104 B1 | 3/2001 | Delph | |
| 6,202,056 B1 * | 3/2001 | Nuttall | 705/52 |
| 6,286,029 B1 | 9/2001 | Delph | 709/203 |
| 6,408,336 B1 | 6/2002 | Schneider et al. | |
| 6,453,419 B1 * | 9/2002 | Flint et al. | 726/3 |
| 6,505,300 B2 * | 1/2003 | Chan et al. | 709/229 |
| 6,560,651 B2 * | 5/2003 | Katz et al. | 709/229 |
| 6,578,076 B1 * | 6/2003 | Putzolu | 709/229 |
| 6,615,349 B1 | 9/2003 | Hair | 713/165 |
| 6,658,415 B1 * | 12/2003 | Brown et al. | 707/10 |
| 6,658,571 B1 * | 12/2003 | O'Brien et al. | 726/26 |
| 6,700,891 B1 * | 3/2004 | Wong | 370/401 |
| 6,701,432 B1 * | 3/2004 | Deng et al. | 713/153 |
| 6,717,943 B1 * | 4/2004 | Schwering | 370/389 |
| 6,728,885 B1 * | 4/2004 | Taylor et al. | 726/24 |
| 6,763,370 B1 * | 7/2004 | Schmeidler et al. | 709/203 |
| 6,772,209 B1 * | 8/2004 | Chernock et al. | 709/225 |
| 6,959,288 B1 * | 10/2005 | Medina et al. | 705/51 |
| 7,200,684 B1 * | 4/2007 | Schales et al. | 709/252 |
| 7,233,997 B1 * | 6/2007 | Leveridge et al. | 709/229 |
| 7,383,569 B1 * | 6/2008 | Elgressy et al. | 726/2 |
| 7,392,234 B2 * | 6/2008 | Shaath et al. | 707/1 |
| 7,464,162 B2 * | 12/2008 | Chan | 709/225 |

* cited by examiner

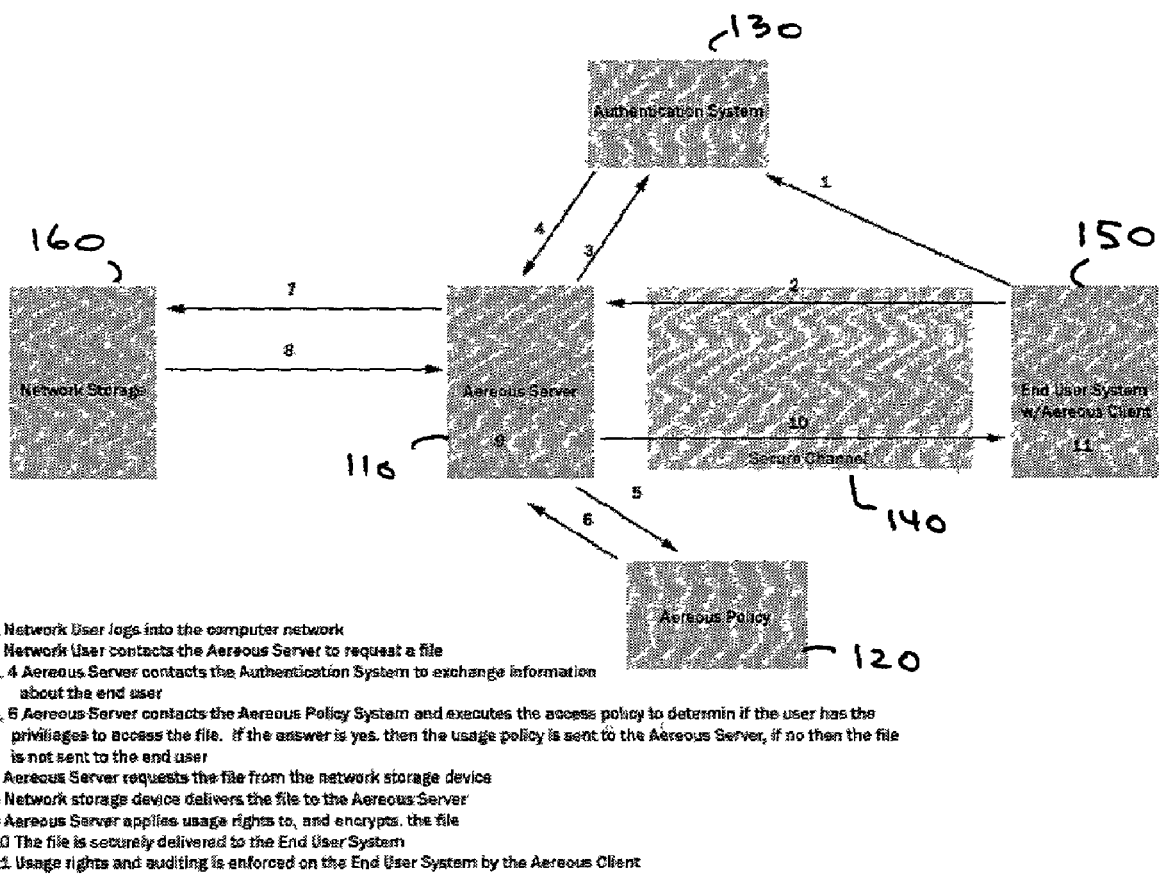

1. Network User logs into the computer network
2. Network User contacts the Aereous Server to request a file
3, 4 Aereous Server contacts the Authentication System to exchange information about the end user
5, 6 Aereous Server contacts the Aereous Policy System and executes the access policy to determin if the user has the privilieges to access the file. If the answer is yes, then the usage policy is sent to the Aereous Server, if no then the file is not sent to the end user
7 Aereous Server requests the file from the network storage device
8 Network storage device delivers the file to the Aereous Server
9 Aereous Server applies usage rights to, and encrypts, the file
10 The file is securely delivered to the End User System
11 Usage rights and auditing is enforced on the End User System by the Aereous Client

FIG. 1

| Field | Length | Description |
|---|---|---|
| Payload ID | 2 bytes | Enumerated type describing the payload type of the message. Further processing of the message is directed by this field. The currently payload identifiers include<br><br>Type · Value · Description<br>AERE_INVALID · 0 · Invalid type<br>AERE_FILE_KEY · 1 · File key payload<br>AERE_BLK_XFER · 2 · Block transfer<br>AERE_STATUS · 3 · Aereous status |
| Flags | 2 bytes | Flags indicating payload processing requirements. The currently defined flags include;<br><br>Flag · Bit · Description<br>Encrypted · 0 · Payload encrypted<br>Signed · 1 · Payload signed (*not implemented*)<br>Reserved · 2-15 · *unused* |
| Length | 2 bytes | Length of message, in bytes. This length measures the field through the the last byte of the payload. |
| Source ID | 2 bytes | Source identifier - uses user or server entity identifier defined in the entity database. |
| Destination ID | 2 bytes | Recipient identifier - uses user or server entity identifier defined in the entity database. |
| Timestamp | 4 bytes | Timestamp (obtained from local or trusted timing source) of message creation. Used to ensure freshness (e.g., mitigate replay attacks). The time is represented by the standard POSIX 32 bit second identifier (seconds since epoch). |
| SeqNo | 2 bytes | Sequence number used to ensure the ordering of messages. |
| AckNo | 2 bytes | Acknowledgement of all messages up to including *AckNo*. |
| Payload | variable | This is the variable length data to be interpreted by payload processing. The format of the payload is detailed in Section 7.3. Based on message flags, this data require additional proces (e.g., encryption, sign). |
| Hash Algo. Identifier | 2 bytes | Enumerate type defining the hash algorithm used in the calculation of the keyed hash. The following hash algorithms are supported by the Aereous system;<br><br>Algorithm · Value<br>AERE_MD5 · 0<br>AERE_SHA1 · 1 |
| HMAC Length | 2 bytes | The length of the HMAC value. Note that some crypgraphic algorithms output more ciphertext than the orginal plaintext. (Question: Is this really needed, or can we always calculate this from the key/hash algorithm info?) |
| HMAC | variable | This is the keyed hash of the message. This value is calculated over all byes prior to the begining of the hash length field. |

FIG. 6B

| Name | Length | Description |
|---|---|---|
| KeyAlgorithmID | 16 bits | (enumerated) identifies both the algorithm and the key length |
| BlockSize | 16 bits | block size for the accessed file |
| IV | 256 bits | Initialization vector used to seed the encryption of file blocks. Further details are defined in Section 7.1. |
| KeyData | 256 bits | The key used to encrypt the file. Where the key size is less than 256 bits, the most significant bits are used and unused bits are padded with zero. |
| UsePolicies | 64 bits | Flags indicating the enabled usage of accessed content (where a bit 1=allowed, 0=denied). The supported bits include:<br><br>Flag    Bit    Description<br>Print    0    Print the file<br>Copy    1    Copy file to local disk<br>Send    2    Transmit the file to external device<br>Reserved    3-63    unused<br><br>*NOTE: The set of usage types are identified in the Aereous Client Design Document, and will be reflected in future version this document as needed.* |
| Pathname | (variable) | full pathname of file being accessed |

FIG. 8

| Name | Length | Description |
|---|---|---|
| Cid | 16 bits | hashed pathname identifier (see Section 6) |
| BlockNumber | 16 bits | block number of transmitted data |
| Length | 16 bits | length of data. Typically equal to the block size supported by the filesystem. |
| Data | (variable) | the file data |

FIG. 9

| Name | Length | Description |
|---|---|---|
| Sid | 16 bits | (enumerated) Type identifying the message semantics. *Details of the status are further specified in the info and text fields.*<br><br>Enum    Numeric    Origin    Description<br>usageExec    0    client    Usage right executed<br>aereousError    1    both    Aereous error encountered<br>dfsError    2    both    Filesystem error<br>infoStatus    3    both    informational (e.g., debugging)<br>clientShutdown    4    client    client shutdown signal<br>serverShutdown    5    server    server shutdown signal<br>*unused*    6-2=    N/A    *unused* |
| InfoLength | 16 bits | length of *info* field. |
| Info | (variable) | Additional status information. The interpretation of this field is directed by the *Sid* field as follows:<br><br>Enum    Subfields<br>usageExec    content ID (*cid*), usage mask<br>aereousError    Aereous error code<br>dfsError    standard UNIX errno<br>infoStatus    information enum<br>clientShutdown    *none*<br>serverShutdown    *none*<br>*unused*    *unused* |
| TextLength | 16 bits | length of *Text* field. |
| Text | (variable) | C-string description of information. Used in auditing or as user notification. |

FIG. 10

Figure 11
Before
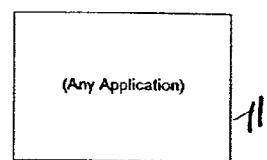 1152
(Any Application)
Server Native Protocol
(Any Server) — 1150
Figure 12
After
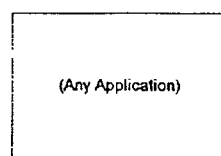 1152
(Any Application)
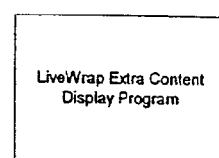 1130
LiveWrap Extra Content Display Program
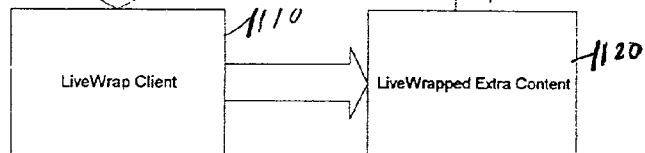
1110 LiveWrap Client — 1120 LiveWrapped Extra Content
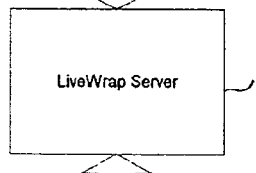 1100
LiveWrap Server
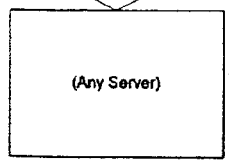 1150
(Any Server)

AereousServer Core Plug-in Architecture

Figure 20

```
Start: 7/30/00    11:49:07 PM
PING from: 24.160.215.100
       to: www.                .com                          Every 500 mSecs
PKT#  RESULT  TIME(ms)  LENGTH   Min    Avg    Max    Timestamp
 1    success    176       40    176    176    176    7/30/00    11:49:07 PM
 2    success    134       40    134    155    176    7/30/00    11:49:08 PM Packets out/in/bad/#loss = 2/2/0/0.0
Round Trip Time (ms) min/avg/max = 134/155/176
● Ping Completed  7/30/00    11:49:08 PM ●
```

Figure 21

| Description | Size (bytes) | Contents |
|---|---|---|
| Aereous Signature | 11 | 'AEREOUS' + 0x01301976 |
| Aereous File Version | 1 | Currently 0x1 |
| File ID | 8 | File's Aereous ID. |
| Usage Count | 2 | Number of usages remaining. Set to 0xFFFF for infinite usages. |
| Expiration Date | 4 | A GMT ANSI RTL style time date stamp that indicates when this file expires. |
| Usage Denied Content | Varying | Once a read attempt fails due to a 0 usage count, this content is displayed to the user. The format is described below under "Content Format" |
| Number Of Push Content Items | 2 | Number of items that are pushed to the user when the file is opened. |
| Push Content Items | Varying | Array of push content items. The format is described below as "Push Content Item Format". |
| Header CRC | 4 | A CRC value for the preceding header bytes. |
| Content Size | 8 | The size of the unencrypted data |
| Encryption Type | 1 | 0 = Unencrypted<br>1 = 2Fish<br>2-255 = undefined |
| Encrypted Data Offset | 8 | A file offset to the beginning of the encrypted data. The encrypted data uses the format described in "Encrypted Data Block". |

Figure 23

VirtualFile

The VirtualFile table lists all files in the system. Each file is associated with a Plug-In and a bundle of facts that are understandable by that Plug-In.

| Column | Type | Description | Sample |
|---|---|---|---|
| *VirtualFileID | Int | System assigned ID | 314 |
| Name | Text | Name of the virtual file. This is the base name, with no parent directory names and no directory separator characters. The name is not case sensitive in the server core, but is allowed to be in the database engine. | SalesReport.doc |
| IsDefault | Bool | Flag indicating whether Name is actually a wildcard pattern match. Use of this flag allows directories to be setup and facts associated with them without having to database each of the files that could reside within that virtual directory. | False |
| VirtualDirectoryID (optional) | Int | ID of the VirtualDirectory that the file resides within. Use NULL for files that reside at the root level. | 4242 |
| PlugInName | Text | Identifies which plug-in will generate the actual file contents. | FTP |
| IsStatic | Bool | Flag indicating whether the file is an actual static file on the server disk or a true virtual file. | True |
| FactBundleID (optional) | Int | Facts for this file. These facts are considered to be "owned" by this file and will be deleted if this file entry is deleted. | 4243 |
| SharedFactBundleID (optional) | Int | Facts for this file. These facts are not "owned" by this file, instead existing as shared facts to assist with centralized administration. | 12000 |
| ShouldLogUsageEvents | Int | Flag indicating whether any access to this file should result in an access log this file.<br>• 1 indicates there should be a log generated<br>• 0 means no log should be generated<br>• NULL or -1 means that the value of this setting should be inherited from the parent directory or the DefaultShouldLogUsageEvents configurable parameter | 1 |

Client Memory Space

DYNAMIC FILE ACCESS CONTROL AND MANAGEMENT

CROSS REFERENCE TO RELATED APPLICATIONS

This application is a continuation-in-part of commonly owned U.S. patent application Ser. No. 09/717,474, filed Nov. 20, 2000, entitled METHOD AND APPARATUS FOR THE REAL TIME MODIFICATION AND INTERPRETATION OF COMPUTER FILES, AND REAL TIME BANDWIDTH MANAGEMENT.

FIELD OF THE INVENTION

The present invention generally relates to computers and computer systems configured to access files or file storage or management systems.

BACKGROUND OF THE INVENTION

The Internet was originally conceived as a distribution network, and in the past six years, has become widely available to businesses and consumers. The more recent availability of inexpensive broadband access has ushered in a new wave of data sharing. This data sharing has created significant issues that arise due to the digital nature of Internet data—the ones and zeros that represent text, music and video on the Internet are much easier to access and modify than their physical counterparts. Two problems this causes are that privacy can be compromised, and content can be illegally duplicated (or "pirated").

Prior art has attempted to eliminate privacy and piracy issues, with limited success. The most basic means by which to protect data has been encryption—the sender modifies data in such a way that it is unintelligible to all but the intended recipient. This has meant reliance on relatively slow algorithms for processing the data to be encrypted and unencrypted. Recent prior art has dramatically reduced the computing power required to encrypt data. However, while encryption is necessary to maintain data security, it is useless if the data's security can be compromised once it has been unencrypted.

Other prior art has been developed to augment the security offered by encryption systems. Digital Rights Management (DRM) systems use various forms of encryption to allow rights holders, such as content owners, a way to persistently protect data. Prior art DRM systems offer unique means of deployment—for example, a DRM system can modify a file so that it can only be accessed once without an encrypted key. If an individual attempts to access the file again, the DRM system will disallow access until the individual has the correct key. This is just one example of how DRM can be deployed. Although prior art DRM solutions have been commercially available for some time, they have received limited acceptance because of the usability barriers they introduce. From a content-owner's perspective, these systems call for the time-consuming and costly process of modifying all of his or her data to comply with the system's rules. The content-owner faces this process every time he or she wishes to add more data to be protected. Consumers face even greater barriers—because of the rules introduced by DRM systems, a user may have to change his or her usage habits. For example, an MP3 listener may be required to switch his or her preferred playback program.

The deployment issues facing those using the Internet to share information are not exclusively inherent in Digital Rights Management systems. Companies may want to modify data in any number of ways attaching liner notes to digital music, linking a patient's record to a medical database, including version information on a book passed between an author and his editor—these are all examples of processes that add extra time and cost to file delivery on the back-end, and compatibility issues on the front end. As more entities connect more devices to the Internet at higher data transmission rates, cost and compatibility problems will only increase. The benefits gained from increased Internet connectivity will ultimately offset the losses. However, the increase in data flowing across both wired and wireless networks introduce further issues regarding speed, prioritization, and Quality of Service (QoS).

More now in wireless networks than in their wired counterparts, bandwidth is a precious commodity. Prior art has developed systems such as, but not limited to, Wideband Code Division Multiple Access and Global Packet Radio Service, that will fill wireless radio frequencies with circuit-switched and packet data in the most optimal way possible for the given spectrum. However, the bandwidth that will be available in Third Generation cellular networks will still not match that in wired networks. Additionally, applications developers face the challenge of not knowing the available bandwidth of their end-users, as it changes based on location, speed and several other variables. Both the wired and wireless world will face increased traffic and network congestion, as more applications are developed to push the limits of available bandwidth.

Beyond Internet applications, many enterprises also face issues with securing files available on or via their enterprise network. As a result, most enterprises) today have deployed sophisticated network security products to protect their information from external threats. Technologies such as firewalls, intrusion detection and user authentication have gained an almost universal acceptance in the marketplace. At the same time, enterprises are also adopting a strong centralized file storage strategies that are built upon network storage devices.

While prior art perimeter and access technologies like firewalls and user authentication do an excellent job of keeping malicious users out of networks, they do little to address other threats. Another threat exists within users who have authorized access to the network. Through network storage devices, authorized users have direct access to sensitive enterprise information.

Even with the majority of enterprise information currently being stored on network storage devices, security has not been a driving force in their design. As a result, these devices have largely implemented simple and inadequate permissions such as read-only and read/write. This simplistic approach has lead to accidental and malicious exposure of enterprise sensitive data to unauthorized parties.

SUMMARY OF THE INVENTION

A dynamic file access control and management system and method in accordance with the present invention may be a proxy file management system that includes one or more file system proxy servers that provide selective access and usage management to files available from one or more file systems or sources. The present invention may embody a secure transport protocol that tunnels distributed file systems, application-independent usage controls connected to files on end-user computers, dynamically merging secondary content to a requested file, and applying bandwidth management to any of the foregoing. Embodied in the various implementations of the present invention is enhanced file security. Preferably, the proxy file management system is transparent to an end-user.

A proxy file management system in accordance with the present invention extends accepted network storage systems with a security infrastructure appropriate for large and rapidly changing network environments. The present invention includes an end-to-end approach to network file security, a robust and scaleable centralized proxy server, client policy enforcement services, and a secure protocol to manage network transmission. These services allow enterprise data to be easily managed and protected through the enforcement of a comprehensive and coherent file protection policy.

A proxy file management system in accordance with the present invention is preferably configured to achieve the following goals:

a. End-to-End Solution—The proxy file management system is a solution that is easily dropped into a network, offering total file sharing security on both an access and usage level, and on a transport level. Enterprises that deploy the proxy file management system never have to worry about also deploying a third-party package to gain full functionality and security.

b. Security—The security with which content is managed and distributed is of paramount importance to the proxy file management system. This includes the security of the interfaces and protocols of the client and server, as well as the deterministic and correct enforcement of policy.

c. Stability—Successfully usage of the proxy file management system in any environment is largely reliant on its ability to consistently and seamlessly deliver content to authorized users.

d. Flexibility—The proxy file management system includes the ability to flexibly represent the content management needs of the enterprise through policy. Thus, flexible and straightforward interfaces to content management systems is provided.

e. Compatibility—Administrators do not wish to introduce new services into their networks. For this reason, it is important to provide an infrastructure that can be integrated into their network with minimal cost. Therefore, the software modules of the proxy file management system are not only compatible with existing infrastructure (e.g., authentication services), but also implement accepted models (e.g., file system semantics).

f. Low Maintenance—The proxy file management system software operates with as little user or administrator involvement as possible.

The proxy file management system is an end-to-end client-server solution to protect information on a content source (e.g., a network storage device or system) from unauthorized access and usage. A proxy system (including a set of proxy servers) is disposed between one or more client devices and at least one content source. The proxy system offers a high level of flexibility in file access policy, wherein the policy can be evaluated at runtime, based on real-time environmental variables such as network status or time of day. The client (or end-user) device includes a client module (or program) that functions with the client device operating system (OS) to deliver application independent file usage controls and auditing. User authentication is performed by an authentication system and policy management is accomplished by a policy system.

The proxy system acts as a file server that mimics the structure and presentation of the content source, for which the proxy system is acting as a proxy. When a file is requested by an end-user of client device the proxy system appears (to the end-user) as a file server. To transfer the file from the content source, the proxy system appears to be a network file sharing client (to the content source). These representations occur simultaneously. When an end-user client device requests a file from the network file storage device, the request is received by the proxy system, which selectively provides the requested file as a function of information the proxy system obtains from authentication system and policy system.

Prior to requesting a file, the user preferably authenticates with authentication system. After authentication, when an end-user requests a file, the proxy system obtains verification of the authentication of the user from the authentication system and in cooperation with the policy system, the proxy system determines if the requesting user has the right to access the file. If access to the file is granted, the proxy system provides the file, in a secure and encrypted manner, with additional information (e.g., usage rights and encryption/decryption keys) to the end-user client device.

Communication between the client device and proxy system are treated according to a secure protocol configured to enable the secure transport of files and file related information across a network. The network may include any of a variety of types of networks, such as a local area network (LAN), wide area network (WAN), virtual private network (VPN), World Wide Web ("Web"), Internet, extranet, intranet, telephone network (including cellular telephone network), or some combination thereof. Any of the foregoing networks may include a variety of wired or wireless communication means. The files sought to be accessed may be any type of computer files, including any type of typical desktop application files, Web or Internet files, e-commerce files, music, audio, or video files, and so on. Such files may be provided by any of a variety of static or dynamic sources or devices, collectively represented as a content source.

In addition to, or as an alternative to, the proxy file management system, a dynamic file access and control and management system in accordance with the present invention may include a dynamic content management system (DCMS), which enables the real time modification and enhancement of computer files as they traverse a server over a network, such as the Internet. For example, the DCMS may be utilized to secure an MP3, attach tracking information to a patient's medical file, or ensure the privacy of an email between an attorney and his or her client. The DCMS also delineates protocols for the attachment of additional data relevant to the file being modified. The DCMS additionally provides a protocol for real-time bandwidth moderation and allocation through a client-server communication.

The DCMS modifies the operating system of a computer to detect and "hook" different types of files based on their header information, physical and binary structure, and other information, and determines which modifications, if any, to make on the file.

If modifications are necessary, the DCMS determines how to make them, and the information source or sources from which to draw supplemental information. This process occurs in the present invention in "real-time," so that data moving across the computer on which the DCMS resides is subject to little-to-no processing delay. The DCMS provides provisions for modifying the header information of a computer file, as well as appending additional information throughout the file. The DCMS additionally allows files to be "wrapped" (protected) with encryption and Digital Rights Management (DRM) packaging, or usage rights.

The DCMS allows a file to be "embedded" with information relevant to the file's destination. For example, a virtual "mall" may be embedded in an artist's song so that end-users can purchase tickets for that artist's upcoming concert.

The DCMS makes a modification to client devices which allows them to interpret files modified by the DCMS. This client-side modification changes system-level code to "hook" files that are opened on these devices. The hook then detects whether modifications made by the DCMS are present, and if so, goes through the steps necessary to interpret these modifications.

In any of the embodiments of the present invention, a protocol for dynamically allocating bandwidth may be included. It initiates communication between a server and a client, both which have software components of the present invention installed. By determining the data requirements of the end-user, and the capacity of the carrier, the present invention will dynamically allocate the maximum amount of bandwidth required to suite the constraints of both. Through the same protocol, the present invention can also, in real-time, set a different data delivery priority than the one currently used. For example, an individual attempting to download an e-book to a portable device using General Packet Radio Service (GPRS) may have his delivery delayed if all of the Circuit-switched data (CSD) in the available spectrum is being used for voice calls.

A system in accordance with the present invention includes a standard computer server across which data moves, a modification to the operating system of the server, a software application to interact with and control the server, and a modification to the operating system of a client device.

A system in accordance with the present invention consists of server software running as an application on a standard hardware configuration and client software either hooking into or running as a process on top of the operating system on a standard hardware configuration.

BRIEF DESCRIPTION OF THE DRAWINGS

The foregoing and other objects of this invention, the various features thereof, as well as the invention itself, may be more fully understood from the following description, when read together with the accompanying drawings, described:

FIG. 1 is top level block diagram of a proxy file management system in accordance with the present invention;

FIG. 6A and FIG. 6B are diagrams of a content transform and its fields contents, in accordance with the present invention;

FIG. 7 FIG. 8, FIG. 9 and FIG. 10 are diagrams of file key payload formats and block formats in accordance of the present invention;

FIG. 11 illustrates a flow of data in a conventional client-server environment;

FIG. 12 illustrates a flow of data in a client-server environment in accordance with the invention;

FIG. 20 shows data obtained from two packets using the variable data pipeline component, in accordance with an aspect of the invention;

FIG. 21 shows the packet and header structure of a DCMS file, in accordance with an aspect of the invention;

FIG. 23 shows one example of a table that holds data utilized by the DCMS Server to access information from Content Servers, in accordance with the invention;

Figure 2:
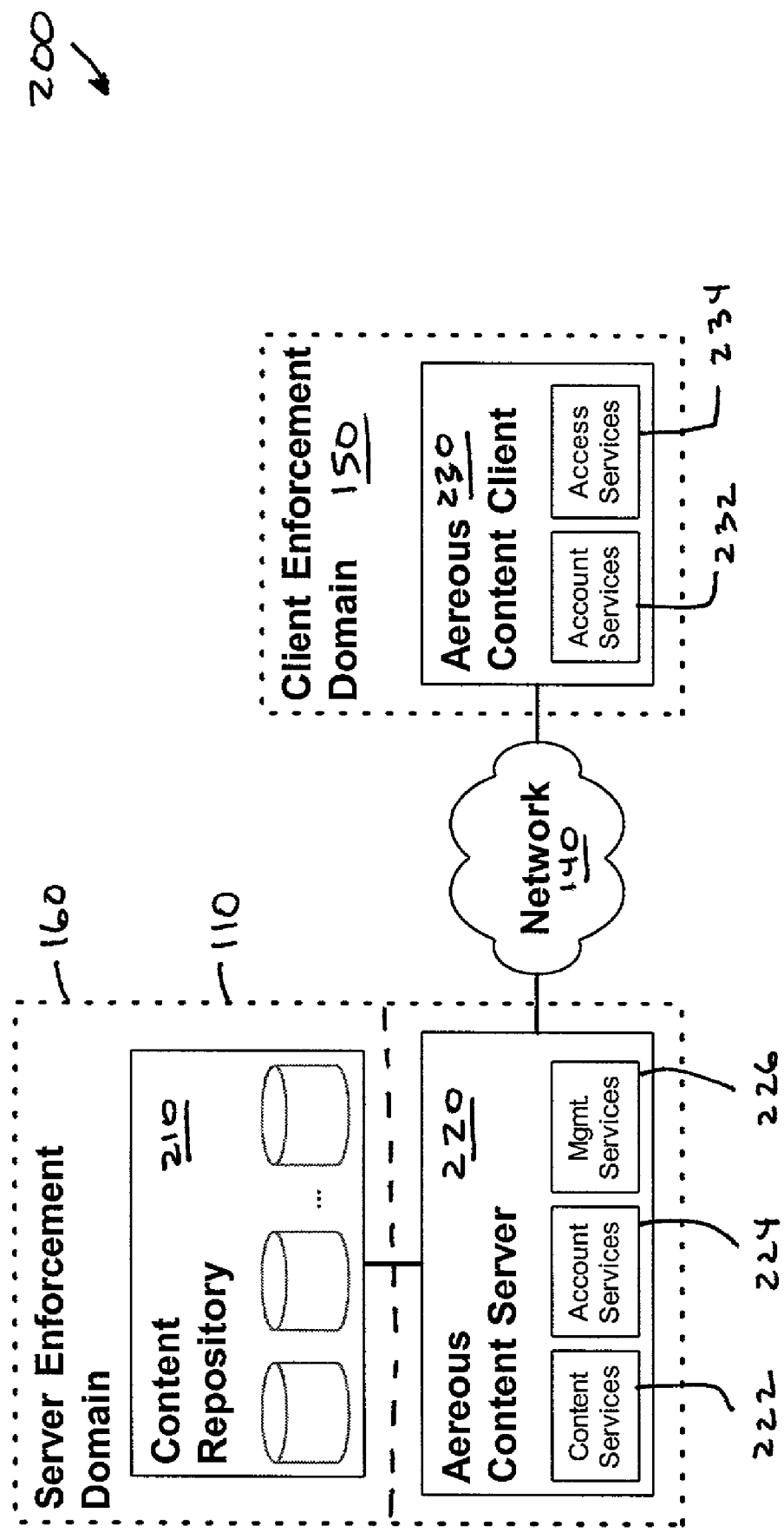
FIG. 2 is a block diagram of software architecture that may be implemented by the proxy file management system of FIG. 1.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENT

A dynamic file access control and management system and method in accordance with the present invention may be a proxy file management system that includes one or more file system proxy servers that provide selective access and usage management to files available from one or more file systems or content sources. The present invention may embody a secure transport protocol that tunnels distributed file systems, application independent usage controls connected to files on end-user computers, dynamically merging secondary content to a requested file, and applying bandwidth management to any of the foregoing. Embodied in the various implementations of the present invention is enhanced file security. Preferably, the proxy file management system is transparent to an end-user.

1. System Overview

A proxy file management system in accordance with the present invention extends accepted network storage systems (and other content sources) with a security infrastructure appropriate for large and rapidly changing enterprise environments. The preferred embodiment of the present invention includes an end-to-end approach to network file security, a robust and scaleable centralized proxy server, client policy enforcement services, and a secure protocol to manage network transmission. These services allow enterprise data to be easily managed and protected through the enforcement of a comprehensive and coherent file protection policy. A proxy file management system in accordance with the present invention is preferably configured to achieve the following goals:

a. End-to-End Solution—The proxy file management system is a solution that is easily dropped into a network, offering total file sharing security on both an access and usage level, and on a transport level. Enterprises that deploy the proxy file management system never have to worry about also deploying a third-party package to gain full functionality and security.

b. Security—The security with which content is managed and distributed is of paramount importance to the proxy file management system. This includes the security of the interfaces and protocols of the client and server, as well as the deterministic and correct enforcement of policy.

c. Stability—Successfully usage of the proxy file management system in any environment is largely reliant on its ability to consistently and seamlessly deliver content to authorized users.

d. Flexibility—The proxy file management system includes the ability to flexibly represent the content management needs of the enterprise through policy. Thus, flexible and straightforward interfaces to content management systems is provided.

e. Compatibility—Administrators do not wish to introduce new services into their networks. For this reason, it is important to provide an infrastructure that can be integrated into their network with minimal cost. Therefore, the software modules of the proxy file management system are not only compatible with existing infrastructure (e.g., authentication services), but also implement accepted models (e.g., file system semantics).

f. Low Maintenance—The proxy file management system software operates with as little user or administrator involvement as possible.

FIG. 1 shows the preferred embodiment of a proxy file management system 100 in accordance with the present invention, which is an end-to-end client-server solution to protect information on a content source 160 (e.g., network storage device) from unauthorized access and usage. In this embodiment, a proxy system 110 (including a set of proxy servers) is disposed between one or more client devices 150 and at least one content source 160. The proxy system 110 offers a high level of flexibility in file access policy, wherein the policy is evaluated at runtime based on real-time variables. The client (or end-user) device 150 includes a client module (or program) that functions with the client device 150 operating system (OS) to deliver application independent file usage controls and auditing. In the embodiment of FIG. 1, user authentication is performed by an authentication system 130 and policy management is accomplished by a policy system 120.

In the preferred form, the proxy system 110 acts as a file server that mimics the structure and presentation of the content source 160, for which the proxy system 110 is acting as a proxy. When a file is requested by an end-user of client device 150 the proxy system 110 appears (to the end-user) as a file server. To transfer the file from the content source 160, the proxy system 110 appears to be a network file sharing client (to the content source 160). These representations occur simultaneously. When an end-user client device 150 requests a file from the content source 160, the request is received by the proxy system 110, which selectively provides the requested file as a function of information the proxy system obtains from authentication system 130 and policy system 120.

Prior to requesting a file, the user preferably authenticates with authentication system 130. After authentication, when an end-user requests a file, the proxy system 110 obtains verification of the authentication of the user from the authentication system 130 and in cooperation with the policy system 120, the proxy system 110 determines if the requesting user has the right to access the file. If access to the file is granted, the proxy system 110 provides the file, in a secure and encrypted manner, with additional information (e.g., usage rights and encryption/decryption keys) to the end-user client device 150.

Communication between the client device 150 and proxy system 110 are treated according to a secure protocol configured to enable the secure transport of files and file related information across a network 140. In the preferred form, network 140 may include any of a variety of types of networks, such as a local area network (LAN), wide area network (WAN), virtual private network (VPN), World Wide Web ("Web"), Internet, extranet, intranet, telephone network (including cellular telephone network), or some combination thereof. Any of the foregoing networks may include a variety of wired or wireless communication means. The files sought to be accessed may be any type of computer files, including any type of typical desktop application files, Web or Internet files, e-commerce files, music, audio, or video files, and so on. Such files may be provided by any of a variety of static or dynamic sources or devices, collectively represented as v 160 (and file repository 210, see FIG. 2).

2. Proxy System 110

A proxy system 110 in accordance with the present invention includes a set of servers running server-side proxy file management functionality that applies flexible authorization and access control policies over managed content, such as files stored in a content source 160. The server-side proxy file management functionality may take the form of a content subsystem or program, described in more detail with respect to FIG. 2 and FIG. 3. Unlike current security services, policies in accordance with the present invention not only allow administrators to map users to allowable access, but to base access on run-time environmental conditions. Users can be flexibly organized within the system, wherein the policies associated with a user may vary from file to file. The policy infrastructure interfaces with widely deployed network services, so provides for easy integration into existing networked file systems.

The proxy system 110 acts as a secure proxy device or server to current content sources 160 (e.g., distributed file systems (DFS)). The proxy system 110 interfaces with and maintains authentication, access and usage control and security across computer network utilization of content sources 160. The proxy system 110 is preferably logically oriented between content source 160 and clients 150, or in such a way that direct access from the proxy server 110 to the content source is accomplished, preferably without direct access to content source 160 by client 150. The content source 160 being "proxied" may also be contained within the same physical space as the proxy subsystem software; in such a case the proxy process may be integrated with another operating system.

As mentioned, the proxy system 110 comprises is a suite of server-side software modules (e.g., the content subsystem 220 of FIG. 2) executing on one or more proxy servers, i.e., one or more computers other than the client device or system 150. The proxy system may be configured for any known for of operating system (e.g., the Berkeley Software Distribution (BSD) family of operating systems, Microsoft Windows™ and Sun Solaris™). Preferably, the suite of server-side software modules is hardware independent.

Preferably, the proxy server suite of server-side software modules uses many of the standard functionality of commercial operating systems to accomplish its normal operations. These standard functions include hardware interfacing and standard data input/output. Certain functionality can be optimized to serve specific, specialized purposes. These modifications can include specialized networking functionality (e.g., based on the BSD sockets), customized process and thread libraries, and optimized device drivers for networking.

3. Client 150

A client 150 includes a client device and a client module. A client devices in accordance with the present invention may be any of a variety of types of devices, including personal computer, workstation, server, personal digital assistant (PDA), telephone (including, cellular telephone), pagers, Web enabled appliances, or other network enabled devices. The client module 230 (see FIG. 2) acts on behalf of the user in obtaining credentials and managing security-related material from proxy system 110. This information is used over the course of a session to gain access protected content from content source 160, and to protect the content from exposure to adversaries on the network. In addition to protecting data from unauthorized users, the client module hosted on client 150 enforces use policies. Use policies limit the kinds of operations allowed on protected content. For example, a particular user may not be permitted to print an accessed file. Use policies are communicated to the client 150 at access time, and enforced over the lifetime of the user's session.

4. Authentication System 130

The authentication system 130 integrates with currently existing and implemented third-party authentication services (or servers). These include, but are not limited to, solutions from Entrust, Microsoft, Intel, RSA, Novell, and Computer Associates. Integration with these third-party solutions is managed through a plug-in layer within the authentication system 130. This allows for the easy and rapid integration of current and future authentication mechanisms. These authentication services can be executed in application form (or process/thread form) on the same physical computer system as the proxy system 110, or a remote system. In the case of remote system communications, information is transmitted over a computer network utilizing, in the preferred embodiment, either UDP or TCP. Security protocols such as Diffie-Hellmen and Secure Socket Layer (SSL) are also supported to facilitate the secure transfer of sensitive information such as shared session secrets.

In situations where there is not a third-party authentication service deployed, the proxy system's authentication subsystem can be implemented to provide the required authentication. The preferred embodiment of the proxy system's 110 authentication subsystem understands the potential directions that future authentication systems might take. As such, the proxy system's 110 authentication subsystem (discussed with respect to FIG. 3) is able to work with a variety of additional authentication methods such as bio-metric and smart-card based solutions that may not explicitly use a client-server architecture.

5. Content Source 160

The proxy system 110 utilizes a database or content source 160 for the storage of a variety of different forms of information (or files). This information includes policy, rule and user-related information, as well as auditing information. In the preferred embodiment, the storage system is a SQL-compliant database, such as PostgresSQL or Oracle. The contents of the content source 160, including the database, is protected so that it is only accessible to a subset of the proxy system 110 components that have been explicitly granted permission to access and manipulate the database. In the preferred embodiment, a username and a password are used to limit the access of the database to the authorized proxy system 110 components. In deployment-specific situations, the contents of the entire network content source 160 can be encrypted to further increase security. The content in the content source 160 is username and password protected to prevent unauthorized access to, or manipulation of, information within the database. In deployment-specific situations, the contents of the entire content source 160 can be encrypted to increase security.

The content source 160 includes a database application and the actual content (or database files). The database application and files can be executed and/or stored in a number of different locations. In the preferred embodiment, the database application is executed on the same physical device as the proxy system 110 and the database file is stored on the content source 160 for which the proxy is provided. Additional embodiments include, but are not limited to, database application and files stored on remote servers or the database file stored on the servers of the proxy system 110. In case of access to the database over a network, the communication between the authorized components of the proxy system 110 and the content source 160 is secured using commonly available solutions, such as SSL.

6. Architecture

FIG. 2 shows an embodiment of a software architecture 200 that may be included in a proxy file management system, in accordance with the present invention. Within architecture 200 there exists a number of subsystems that work in concert to accomplish the goals of the preferred embodiment. Software architecture 200 in the preferred form is comprised of three distinct entities: a content repository 210, a content subsystem 220, and a client module 230. As is shown, content repository 210 is hosted on content source 160. Proxy system 110 hosts a content subsystem 220 and client device 150 hosts client module 230, which interact across any of a number of networks 140, as previously discussed.

Content repository 210 acts as a persistent store for protected content (e.g., content in content source 160). The content source 160 may be comprised of commercial-off-the-shelf (COTS) storage devices, and all communication with storage uses standardized interfaces (e.g., Network File System (NFS)). The content repository 210 is directly accessible only by content module 220 of proxy system 110.

A. Content Subsystem 220

The content subsystem 220 regulates access to files in the content repository 210 through the evaluation and enforcement of authentication and access control policies. The content module 220 executes on one or more dedicated hosts (e.g., servers), which together form the proxy system 110 of FIG. 1. The content module 220 can be characterized as providing or including the following services:

1) Content Services 222—Access to protected content is governed by content services. These services enforce authorization and access control policies defined by system administrators and security personnel.
2) Account Services 224—Based on provided credentials, account services 224 authorize each client requesting access to content. The assignment and distribution of perishable credentials (used later as proof of access rights) is managed by this service.
3) Content Management Services 226—The definition of what and how content is protected is defined by system administrators and security personnel through the content management services 226. Content management services provide interfaces for the definition, modification, and auditing of these configurations.

Content Service 222

The content subsystem 220 must be able to "speak" the computer protocols of the other devices and systems with which it interfaces, and to which it acts as a proxy, since the proxy system 110 is designed for use as a proxy to content source 160. In the case of content source 160, these protocols currently include, as examples, the NFS and Common Internet File System (CIFS). The files may be statically stored, dynamically created, files provided by a third party source, files containing real-time (or near-real time) information, or some combination thereof. The invention also contemplates, and is intended to operate with, other current and future file system derivatives and developments. The content subsystem 220 also contemplates future additions through a generic interface architecture.

The content subsystem 220 is responsible for all connection and state management. This is accomplished through a system of thread and socket pools that are designed to minimize the need for "on-the-file" resource allocation. State is maintained based upon the needs of the individual protocols and users being serviced. Connection recovery, keep-alive status, and error/flow control is also part of this management. Additionally, since the proxy file management system supports both read and write file operations (at a very basic level), file locking and write management of the respective file system is mimicked.

Information is stored on the content source 160 and may be either encrypted (i.e., protected) or unencrypted (i.e., plain-text). To the proxy subsystems, it is not important whether or not the files at content source 160 are encrypted or unencrypted. However, in cases where physical security is an issue, it is believed that all files will be stored on the content source in an encrypted form. Therefore, if a malicious party were to physically tamper with the content source they would be unable to gain access to the information stored thereon.

Encryption of the files as they are delivered from the proxy system 110 to the end-user client device 150 is also implemented within the content subsystem 220. Encryption is preferably implemented through a generic interface, which allows for the simple migration between encryption algorithms. The preferred embodiment, the content subsystem 220 utilizes the Advanced Encryption Standard, known in the art, as the default encryption algorithm, but different encryption algorithms may be used.

The network file storage system 160 is also utilized, in the preferred embodiment, for high-speed caching of frequently used content that the proxy system 110 accesses on a regular basis. The proxy system 110 also uses the content source to store METAFILES. The METAFILES are implemented on a one-to-one relationship with all the directories (or folders) on the content source 160. The METAFILES (discussed below with respect to Table 3) are plain-text files that contain information pertaining to all the files stored within the related directory. This information includes a long-term encryption key cache for the files stored within the directory. Policy information is also stored within the metafile.

Account Services 224

Figure 3:
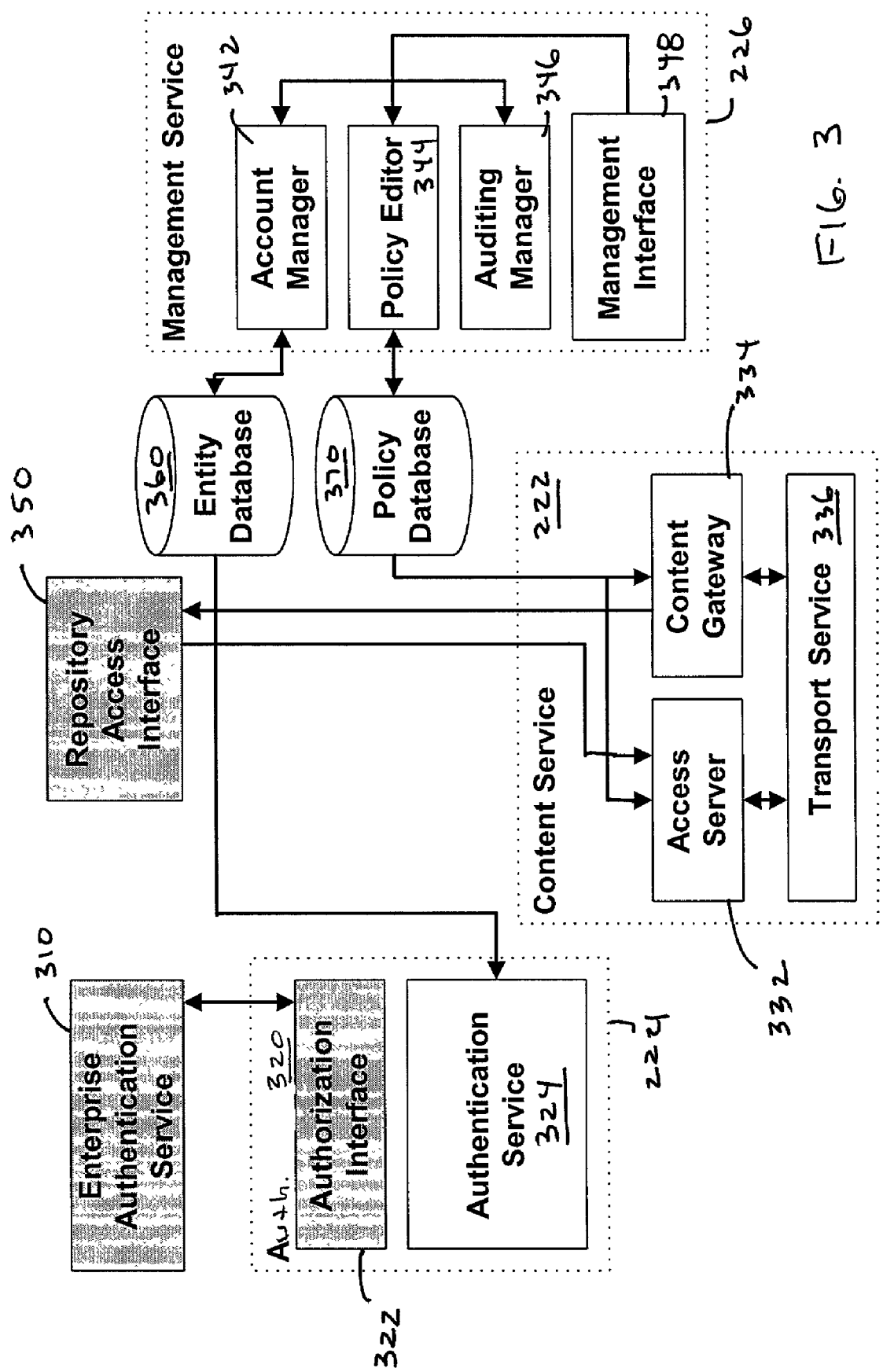
FIG. 3 is a block diagram of the proxy server-side subsystem of FIG. 2.

The account services module 224 of the proxy system 110 content subsystem 220 includes an authentication subsystem 320, shown in FIG. 3, including an authorization interface 322 and authentication service 324. The authentication subsystem 320 is implemented to manage all security aspects of the proxy system 110. The authentication subsystem 320 is designed to create a trusted environment within a (potentially) hostile environment through the utilization of currently implemented generic authentication and/or authorization information. The two major sections within the authentication subsystem 320 are key management and authentication management.

The content subsystem 220, in the preferred embodiment, requires a form of authentication to understand who users are when files are requested. The most common way to currently gain this information is through a pre-existing "login" authentication mechanism. Most enterprises today have some form of login system in place from a major third-party provider, such as authentication system 130. Current scenarios require that a user enter a username and password (i.e., credentials) when the user turns on their computer, or begins to use the computer after a pre-specified amount of idle time has lapsed.

When an end user enters its username and password, this information is transmitted to a central server computer (as part of authentication system 130) that determines if the user has presented the correct credentials. If the correct credentials have been presented, the user is allowed to access the computer or network, as the case may be. The authentication process between client 150 and authentication system 130 generates what is herein referred to as a "shared secret." A shared secret is an artifact of the authentication process that only the enterprise authentication service 130 and the client 150 know. When these credentials are presented, the proxy system 110 does not intercede with the authentication process. However, once the authentication process has been completed (as determined by the client), the proxy system 110 communicates directly with the enterprise authentication service 310 of FIG. 3 to gain a contextual understanding of identity of the user.

Included in this process is the transmission of the client/authentication service shared session secret to the proxy system 110, for use by the authentication service 324 of the account services module 224; FIG. 3 provides greater detail. User credentials are also passed from the authentication service to the proxy system 110 authentication subsystem. The shared session secret and user credentials are stored in separate caches and are assigned a globally unique entity identification number (EID). The EID is assigned directly to the credential management cache, with a reference to the shared secret cache. This EID serves as the interface through which users are further identified and with which they are interacted.

User shared session secrets and credentials are stored in temporary caches. This eliminates the requirement for input/output intensive database operations. Since the shared session secrets and credentials are only valid for short periods of time, and are also available (in an acceptable form) from the enterprise authentication service, there is no need for a long-term storage strategy for the shared session secret or the credentials.

Content Management Service 226

The final major subsystem of the content subsystem 220, in the preferred embodiment, is the management services module 226. The management services module 226 implements the interface for specifying system settings, specifying policy, editing users and groups, and retrieving auditing information.

The management services module 226 maintains the status and configuration of the content subsystem 220. This includes all the information supplied by system administrators during the "First Run Configuration" set-up, as well as all information regarding the configuration and operating of the proxy system 110 in future uses. This information includes usernames and passwords for administrative users of the proxy system 110, network addressing information for the content source 160 and the proxy system 110, and statistical/log output information. Also included in configuration editor of the proxy system 110 are interfaces to control the usage preferences for all other proxy system 110 subsystems such as authentication server/services information and user store data. Included in the system configuration system is the ability to push information to remote servers. This information may be designed to alert administrators of the system that there are software and informational updates available to them, for example.

The management services module 226 is directly involved in the implementation and application of policies. When a file is requested by an end-user, it is routed through the content service module 222. The content service module 222, in turn, contacts the management services module 226 to determine if the user has access privileges on-the-file. The management services module 226 evaluates the user/file specific policy from the METAFILES and database, and returns either a "yes" or a "no" to the content subsystem 220. If the answer regarding access is a "yes," then usage policy is also delivered to the content service module 222 from the management services module 226.

FIG. 3 shows a detailed view of modules that may comprise the content system 220, as well as some of the services, modules and entities with which it interfaces. As discussed previously, the content system 220 implements management functions, performs user and administrator authorization, and delivers content to client devices 150. The content system 220 may be executed on one or more hosts providing or accessing the following services:

1) Enterprise Authentication Service 310—As previously discussed, target enterprises may use a wide variety of authentication systems 130 or infrastructures. Hence, it is necessary to integrate the dynamic file access control and management solution with existing authentication services. Where available and desirable, existing enterprise authentication services 310, hosted on authentication system 130, are directly accessed by account service module 224 to obtain identity-proving credentials. Note that there may be multiple authentication services from which identity information may be mapped.

2) Authorization Interface 322—Included as part of the account services module 224, this interface includes, as one example, a GSSAPI generic authorization interface, and implements the basic primitives used to distribute credentials used for content access. The proxy server-side implementation of this interface preferably allows simultaneous authentication protocol instances.

3) Authentication Service 324—Included as part of the account services module 224, the authentication service 324 creates (via the authorization interface distributes) credentials used to gain access to the protected content. The form of credentials and guarantees provided by this service is a reflection of the security requirements of the target enterprises.

4) Repository Access Service (or Interface) 350—Inaccessible by hosts/processes external to the proxy system 110, the access service 350 provides access to the raw content stored in the content repository 210. Access optimization (e.g., caching strategies) and content transforms are implemented by this service. The natively supported NFS protocol is used to access and modify the NAS file-system.

5) Access Service (or Server) 332—Included as part of the content services module 222, all content acquisition is achieved through the access service 332. Clients communicate content requests with associated authentication information. Access policies are acquired (and potentially cached) by the access service 332. As is consistent with defined policies, content is returned to the client 150. The content is delivered under an appropriate (and possibly policy defined) set of security guarantees (e.g., confidentiality, integrity, etc.).

6) Content Gateway 334—Included as part of the content services module 222, content updates are managed by the content gateway 334. Using a protocol similar to the access service 332, updated content is pushed to the content repository 210 through the repository access interface 350. Policy determines the conditions under which an update should be accepted. Note that care must be taken to ensure synchronization between the access service 332 and content gateway 334.

7) Transport Services 336—Included as part of the content services module 222, content and state information (e.g., file-specific keying material, usage policy) is communicated to and from the client 150 through the transport service 336. This service provides a set of security and delivery guarantees. An overview of this service is presented below (in Security).

8) Account Manager 342—Included as part of the management services module 226, the identification and authentication requirements of client 150 and administrator entities are maintained through the account manager 342. This service maintains the tables and synchronization of entity information, and potentially maps the enterprise authentication service credentials to universally unique identifiers.

9) Policy Editor 344—Included as part of the management services module 226, all content access policies are maintained via the policy editor 344. This service performs internal policy consistency validation, rights revocation, and synchronized policy updates. The definition of this service is determined largely by the definition of the supported policies identified below (in Policy).

10) Audit Manager 346—Included as part of the management services module 226, the audit manager 346 specifies and enforces all policies relating to the auditing of content access. Auditing information is efficiently recorded to an ASCII file. Stored auditing information is exported off-line to a database format, and viewing using several auditing tools supported by the auditing management interfaces.

11) Management Interface 348—Included as part of the management services module 226, administrators specify all entity, policy, and auditing configuration through the management interface 348. Simplicity of this user interface is a key consideration.

12) Entity Database 360—Entity information used by authentication services is stored in the entity database 360. The definition of the fields and tables of this database is the result of the analysis of the support forms of authentication.

13) Policy Database 362—Access and usage policies are retained in the policy database 342. Policies included in this database describe the access and usage restrictions to be placed on entities. Note that this does not map policy to content, only specifying the specifics of policies to be applied. These policies are similar to reusable policies defined in the IETF Policy Working Group's Policy Common Information Model, known in the art. The format of both the entity and policy is presented below (in Policy).

B. Client Module 230

In the preferred embodiment, the client module 230 evaluates the usage policy inside the kernel of the client's OS. These usage rights can include all aspects of a user's interaction with a file, including, but not limited to: copy/cut/paste, printing, screen capture, launch application control and auditing. Since policy is enforced within the kernel of the OS, malicious users are prevented from compromising the usage policy at runtime because direct access to the kernel is not possible without crashing the system.

The usage rights are enforced through the trapping of kernel-level OS calls that are tied to a process list. This trapping is accomplished through an understanding of the APIs and other system-level calls that are supplied by an operating system to an application. These APIs and system calls allow for an application to run correctly under an operating system and to take advantage of the functionality that the operating system has to offer. The client module 230 is between the application and operating system, which allows the client module 230 to understand what the application requests from the OS, and modify to these requests an needed to control how information is used.

When a call is made to the client's OS that has been identified as potential source of data movement, the client module 230 intercepts the call between the application and the OS. As the interception occurs, a list of tagged processes (open files, visible windows, executing applications) is checked to see if the system call will result in protected information being acted upon. If it is determined that the request's source was not acting on a process relating to the applicable usage policies, then the call is allowed to proceed without any further action by the client module 230. However, if it is determined that the call will result in a protected file being acted on, then the usage rights of that particular file are evaluated from within the kernel. If the call is within the allowed functionality set forth in the usage policy, then it is allowed. If the call is not allowed, then the call is blocked and the user is notified.

When an application is launched and a protected file is opened, the file's usage policy is evaluated, decrypted and securely presented to the application's process thread. The user is not presented with anything new within the application. However, if they attempt to engage in an action that is not permitted by the usage policy, they are prevented from doing so, and the administrator of the system has the ability to, for example, make a dialogue box appear informing the user of the violation, and provides the necessary contact information to have the policy changed, if so desired.

Additionally, the client module 230 can provide a very granular level of file access and usage auditing. This feature is very valuable to organizations that must spend capital to conduct repetitive security audits. It also allows for a strong chain of accountability in the event that information is compromised from within an organization. Certain events in an audit log can also provide a real-time alarm to system administrators and managers. The auditing capabilities are defined by the enterprise deploying the proxy file management system 100, but they can extend from limited access logging all the way to inter-application action (e.g. menu selections) auditing.

The client module 230 is designed to be the final line of defense against unauthorized use of enterprise information. Its focus is on the enforcement of usage policy applied by the proxy system 110, and the highly specific auditing functionality. The client module 230 OS kernel-level control of files gives enterprises unparalleled power in their ability to avoid costly application compatibility rewrites and upgrades, as well as a level of security not currently found in traditional file systems.

In the preferred embodiment, client module 230 enforces authorization and access control policies by redirecting OS primitives, as previously described. Hence, on each client device 150 a set of proxy file management system 100 libraries is installed. The client module 230 can be characterized as providing the following services:

1) Account Service 232—Accounting services module 232 communicate identity-proving credentials to the proxy system 110. In response, the proxy system 110 provides perishable credentials used to later gain access to protected content.

2) Content Services 234—Content services module 234 provides access to protected content from content source 160. Access policy is enforced at the client 150 through a set of enforcement services.

Figure 4:
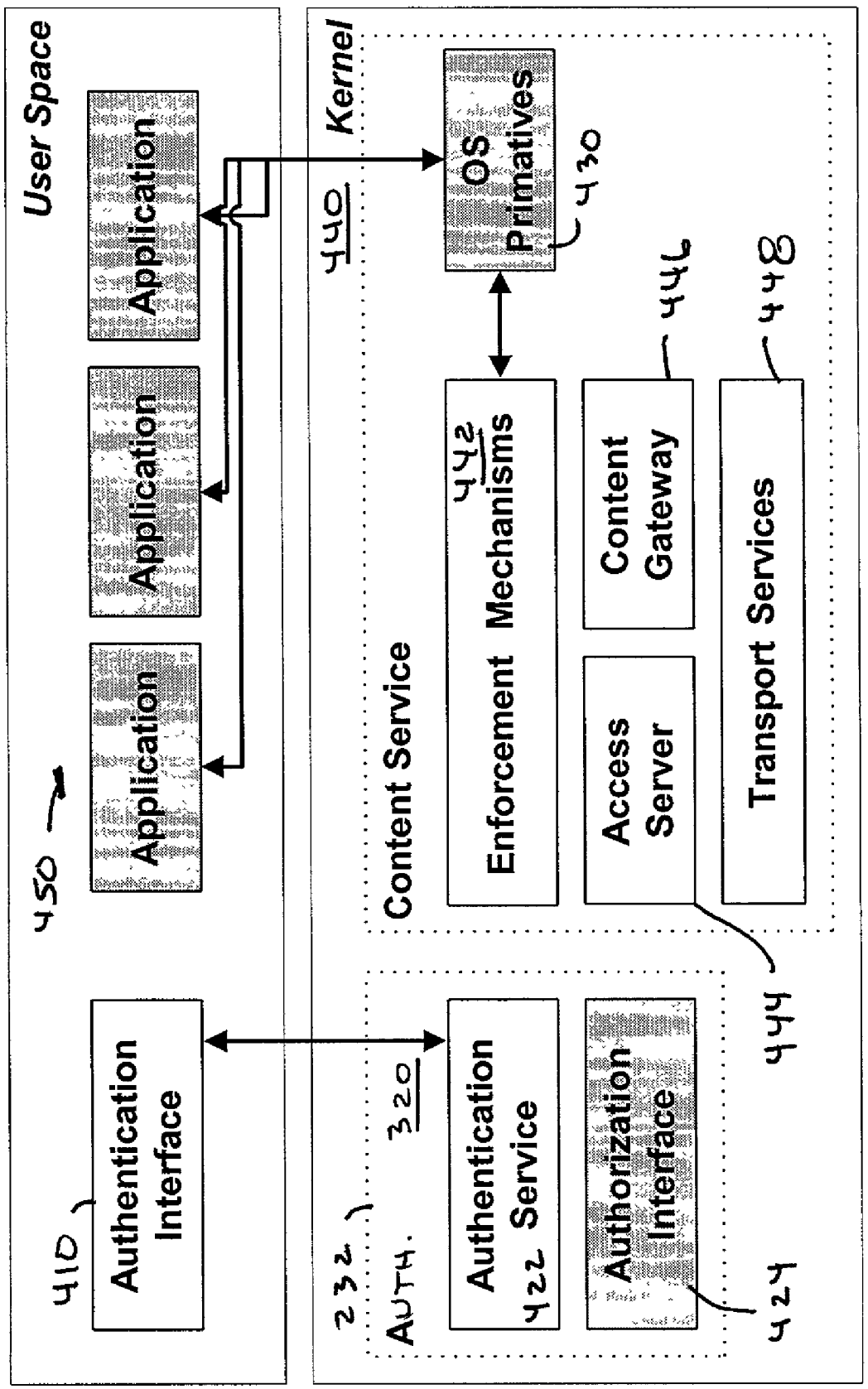
FIG. 4 is a block diagram of the client-side software of FIG. 2.

FIG. 4 illustrates the modules of client device 150, including client module 230. Client module 230 enforces usage policies at each user host. All enforcement occurs within the kernel 440 of the host operating system. Client module 230 provides the following services:

1) Authentication Interface 410—Possibly through an existing authorization interface (e.g., Windows login), this authentication interface 410 obtains the identity or rights proving credentials used to infer access rights. As convenient and desirable, additional authorization interfaces (e.g., smart-cards, proximity devices, etc.) may be accommodated.

2) Authentication Service 422—As part of the account service module 232, authentication service module 422 obtains the time-sensitive identity-proving credentials. Authentication service module 422 communicates with the enterprise authorization service (through authentication interface 410) to obtain credentials. Credentials are cached in a protected and possibly encrypted memory or storage device.

3) Authorization Interface 424—As part of the account service module 232, the GSSAPI generic authorization interface 424 implements the basic primitives used to obtain credentials used for content access. This interface provides an API for client authorization.

4) Applications 450—Applications accessing protected content are not modified in any way in the preferred embodiment. However, the ability to access, modify, or manipulate content will be governed by associated policies, with the context of the application.

5) Enforcement Mechanisms 442—As part of the content service module 234, usage policies are enforced by the redirection of operating system calls to proxy file management system defined enforcement software. Redi- 6) Access Server 444—As part of the content service module 234, access server 444 performs all cryptographic and protocol operations necessary to gain access to protected content at content source 160. The access server 444 provides the proxy system 110 with an access request. Credentials obtained by the authorization service 422 (or some byproduct of the credentials) are provided as necessary to the proxy system 110.

7) Content Gateway 446—As part of the content service module 234, content updates are communicated to the proxy system 110 through content gateway 446. The operations performed by this service are largely similar to the access server 444, save that the modified content is delivered to the server for further processing.

8) Transport Services 448—Content and state information (e.g., file-specific keying material, usage policy) is communicated to and from the proxy system 110 through the transport service 448. The content is securely transmitted to the client. Once obtained, a plain-text version of the content is presented to the enforcement mechanisms 442. The set of security and delivery guarantees implemented by this service is described below (in Security).

9) OS Primitives 430—These are the OS basic primitives, known in the art, upon which applications are built. System calls are redirected to the enforcement mechanisms 442 and applied as is necessary to content in accordance with applicable policies.

In the preferred form, client module 230 is an OS software plug-in that provides two key features of the overall proxy file management system 100. The first feature is the enforcement of usage policy, the second is detailed auditing. The client module 230 is also responsible for the client-side communications through the proxy file management system 100 secure protocol, described in further detail below.

An exemplary focus of client module 230 is with Windows 32 platforms, such as the Windows NT/2000/XP platform, due to a high level of adoption in corporate networking environments as a client system 150. The client module 230 can be deployed via downloadable installer, compact disc, or as part of a network install/image push system. Once the client module 230 is installed, the end-user is not required to interact with it, nor do they even need to know that it is there; it can be completely transparent. As previously discussed, the authentication information required by the proxy file management system 100 are derived from assets that are already in place on network user systems (such as computer user login).

This client-side security perimeter is implemented such that it is independent and transparent to all application programs executing on the end-user's computer 150. Thus, in the preferred embodiment, there is no requirement that application developers to integrate the client module 230 within their software. The client module 230 executes correctly, enforcing all proxy file management system client-side requirements, with ambivalence for all other processes and applications executing under an end-user's operating system.

Users normally access files on content source through the Microsoft Network Neighborhood window or content management software, with the present invention the file browsing process is not changed in anyway from the user's perspective, i.e., users continue to use Network Neighborhood or content management software, and other standard applications to access remote storage drives and directories. Once the proxy file management system is deployed, there is either a new storage device or a new storage device is available that is proxy file management system enabled or a current storage device becomes proxy file management system enabled. Access to the proxy file management system enabled content source 160 requires that the end-user machine 150 have the client module 230 installed. This measure is a first defense against external individuals who penetrate the network and internal users with no reason to use the proxy file management system.

The distributed file system functionality is accomplished through a file system driver. The file system driver manages all communications with the client 150 and proxy system 110. In the preferred form, the file system driver is a filter-type driver; it does not implement a new type of file system semantic, rather it interfaces with existing file systems (such as FAT and NTFS) and adds additional functionality beyond that offered by the existing file system. In the case of the client module 230 filter driver, rights and encryption management and the proxy file management system secure transport protocol is implemented. All distributed file system communications are resolved through the filter driver, and thus, through the proxy file management system secure transport protocol.

This filter driver allows the client module 230 to intercept and modify file requests to and from file servers as required. This filter driver is responsible for encrypted file access and management. All aspects of management such as key storage is handled within encrypted memory spaces where the key is only known to the kernel-mode client module 230. If required, the client module 230 file system driver delivers the files to the underlying file system (such as FAT or NTFS) in an encrypted format. This is to prevent individuals from simply saving a file from a server secured by proxy management file system 100 to an unsecured desktop system, and circumventing the usage rights. The client module 230 file system driver also makes provisions for virtual memory management and non-static memory storage.

When a user with the client module 230 seeks to access a content source 160 protected by the proxy management file system 100, they are automatically "logged in" to the proxy system 110. Network users never have direct access to the content source 160, as the proxy system 110 is logically between the two. This login process is accomplished without any interaction from the user, as it is automatically accomplished when the user logs in to their client device 150. This login and authentication lets the proxy system 110 know who the user is and what files they are allowed to access and under what circumstances (as defined in the policy for the user and file). Additionally, all communication between the end-user's client device 110 and the proxy system 110 is accomplished using the proxy file management system secure transport protocol, so the security across the network 140 is guaranteed.

When the user requests a file, the access policy is evaluated by the proxy system 110. If access is granted, then usage rights are applied to the file and it is securely sent across network 140 where the user can open it in their usual application (typically, on client device 150). Unlike traditional digital rights solutions, the application being used to interact with the secure file does not need to be rewritten, thanks to OS level integration of client module 230.

The usage rights are supplied from the proxy system 110 through the proxy file management system secure transport protocol. This particular packet is received from the proxy system 110 by, and managed from within, the client module 230 file system driver component. The usage rights for a particular file are transferred from the client module 230 file system driver to a physical location in memory that is encrypted and shared by the client module 230 components. The client module 230 connects between the application and OS. This connection allows the client module 230 to understand what the application requests from the OS, and apply modifications to these requests an needed to control how information is used.

In other embodiments, client 150 (and client module 230) need not obtain usage rights information from the proxy system 110, so need not have a direct link to the proxy system. The content (i.e., one or more files) may be provide via any of a variety of means, after being prepared by a proxy system 110. And, the rights associated with the file may also be provided via any of a variety of means, and need not be provided by the same means as the file itself. For example, the file may be provided via a smart card, floppy disk, or CD ROM, and the usage rights may be e-mailed via a path that does not include proxy system 110. Files and rights may be e-mailed among clients, without the proxy system 110 intervening.

7. First Run Configuration & Maintenance

The proxy file management system 100 is designed to be granted an initial set-up from a system administrator ("sysadmin") individual. The proxy file management system 100 first run configuration is designed to gather all the necessary information for the proper function of the system as a whole. The proxy file management system 100 configuration and maintenance is assisted through automatic scripts that are able to gain information about a network and its resources with limited input from an administrator. Ongoing maintenance of the proxy file management system 100 is preformed after the first run configuration has been completed.

A graphical user interface (GUI) is provided to the administrator for configuration and maintenance. The user interface supports and implements standard visual interface objects. These include, but are not limited to, buttons, labels, fields, dialog/message boxes, graphical representations and a variety of information presentation techniques such as scroll bars and drag/drop. The user interface gains its functionality through a set of APIs delivered through the management subsystem 226 component of the content subsystem 230 of the proxy system 110. This API allows for the interface to gain the information required to display the relevant information, in real-time, in addition to allowing the interface to deliver the user's input back to the unexposed code.

In the preferred embodiment, the interface is implemented in an Internet-based environment, currently delivered over a Web connection and browser. Preferably, the browser supports Macromedia Flash. However, the user interface is such (both with regard to the graphical nature and API set) that it could be easily implemented in (or "ported" to) a variety of different delivery mediums and languages, including, but not limited to, Win32 executable, Mac™ OS application, Java-based application, and so on.

8. Security

While the security model of the proxy file management system 100 is largely defined by Policy (see Policy), there are three areas which require an explicit statement of security goals: authentication, content distribution, and management. The authentication process obtains identity-proving credentials from an existing or proxy system 110 authentication service. The content distribution service distributes file oriented content to clients. The management services provide interfaces that are used to define proxy file management system entities and policy specifications.

A clear definition of the types of security relevant to the proxy file management system 100 is a prerequisite to the specification of a security model. The following gives a brief definition of the different guarantees supported by the proxy file management system and component protocols. Content can take any digital form in the following definitions (e.g., message, file content, etc.).

1) Confidentiality—ensures that no entity except the intended recipient can gain access to content. The strength and lifetime of provided confidentiality is a byproduct of the selection of cryptographic algorithms and the design of key management services.
2) Integrity—ensures that any modification of content can be detected by the receiver. It is expected that any modification will be discarded by the receiver, and such occurrences should be recorded by the system auditing services.
3) Authentication—guarantees that the sender/creator of the content can be unambiguously identified. The mechanisms provided by existing file-system services (e.g., owner identification) may be insufficient to meet the needs of proxy file management system environment.
4) Non-repudiation—guarantee stating that a sender should not be able to falsely deny content assertion. Typically a byproduct of authentication, non-repudiation is frequently used to provide proof of malfeasance. Note that this guarantee not only applies the creation/modification of content, but also as a means of tracking access to sensitive data.
5) Timeliness—guarantee stating that content was created/distributed at a known time. Note that the granularity of this (possible drift in identified time bounds) is a byproduct of the system timing source and system configuration.

An important aspect of the security model is a definition of the adversary. An adversary is an entity attempting to circumvent the security provided by the proxy file management system 100 services. Note that an adversary need not be malicious; clients may diverge from the system specification by omission or unintentional misuse. Specifically, we assume that an adversary may observe all communication passing between the client 150 and the proxy system 110, arbitrarily modify messages passing on the network 140, or arbitrarily delay or reorder messages passing between the client 150 and proxy system 110. Moreover, we assume that an adversary has a large (but not infinite) computing power at his disposal. Further, we assume that the adversary cannot observe or modify communication between the content service 222 and repository 210, nor modify the policy 370 database or entity 360 (see FIG. 3) database directly, except through management interfaces 348. We assume that the basic cryptographic algorithms (e.g., AES) are fundamentally sound (e.g., cannot easily be broken by an adversary).

Authentication Security

The security of the authentication process may be largely defined by existing authentication services as previously mentioned. However, where existing services fail to meet defined security goals, it is necessary for the proxy file management system 100 to provide additional authentication infrastructure. Additional infrastructure may take the form of COTS services. However, any solution must provide interfaces to GSSAPI, in the preferred embodiment.

Any authentication service should provide mutual authentication; that is, both the server and client should be able to unambiguously identify the entity with whom they are communicating. Moreover, both end-points must be able to ensure that there is not a man-in-the-middle (e.g., that all communication is available only to end-points). Both client 150 and proxy system 110 server should ensure live-ness, i.e., the current session is occurring in real-time. Such guarantees will prevent an adversary from mounting replay attacks.

An artifact of the authentication protocol is a shared secret (e.g., key) known only to the client 150 and authentication service. This secret (or some byproduct of it) must be communicated to the content distribution service. Note that policy should determine the length of time the secret is considered valid. Authentication artifacts should be refreshed (i.e., replaced) once the validity lifetime expires. However, one may mitigate authentication costs by taking advantage of previously established session state.

Authentication (and the secret itself) can be classified as either weak or strong. Weak authentication is derived from knowledge known by the client 150 and one or more external parties (e.g., password). Hence, weak authentication provides limited guarantees of client identity. For example, since the authentication system 130 server knows the client 150 password; it may arbitrarily and capriciously act on behalf of the client 150. Strong authentication is built upon knowledge known only by the client (e.g., a private key). The kinds of security required for a particular file protected by the proxy file management system is defined by policy. The cost of providing strong authentication may be significantly higher than weak authentication. Hence, users may selectively apply strong authentication policies for only content that strictly requires it.

Content Distribution Security

As one would expect, content distribution security is of paramount importance. However, note that the kinds of security appropriate for each enterprise (or each distribution) may differ. Therefore, some means of communicating context sensitive security requirements is necessary. The attacks previously identified are all relevant to the content distribution. Counter-measures combating man-in-the-middle, replay, and message reordering attacks must be provided by the proxy system 110. Note that the use of each counter-measure impacts the throughput and latency characteristics of the system. Hence, through policy, it is necessary to allow the specification of the strength of security appropriate for each file.

An increasingly important limitation of existing information services is their inability to combat denial-of-service (DOS) attacks. These attacks flood information services with bogus or nonsensical requests. As a result, the service is overwhelmed by processing bad requests. The proxy file distribution system are preferably used within a controlled network. DOS attack tend do be a lesser concern than those identified previously. DOS attacks are not addressed in detail herein.

The proxy system 110 server enforces access policies. These policies map credentials or entities onto a set of access rights. In the preferred embodiment, access rights are defined to be semantically identical to the POSIX read, write, and execute bits. Note that the credentials and entities will be network agnostic; i.e., to support heterogeneous networks, a universal entity name-space is used. Access policies further define the conditions under which access is allowed. These conditions state under what environmental conditions access is allowed. An in depth statement of the policies and model used for authorization is defined below (in Policy).

Use policies are distributed to and enforced by the client module 230 enforcement mechanisms. Client module 230 restricts kinds of operation that may be performed on the content by proxying operating system calls, as defined above.

Management Interface Security

The management interfaces of the proxy system 110 provide administrators with the ability to define and alter the behavior of the proxy file management system 100. For ease of implementation, this is performed through a simple HTML based user interface, described above. Depending on the embodiment, the management interfaces may provide a single point of failure for the proxy file management system. In such a case, any entity with access to these interfaces would be able to arbitrarily alter system behavior. Hence, careful design of interface security is necessary.

The central security issue with the management interfaces is the definition of the entities which have access. This is typically implemented by defining administrator credentials to be given to special entities within the network. As HTML is used as the common interface, it is likely that the existing Web security tools be used for this purpose. For example, the use of X.509 certificates is highly desirable; most browsers and Web servers support the Secure Socket Layer (SSL) protocol. Hence, the certificates will be used with COTS security services implemented in existing tools. Note that the SSL (and Transport Layer Security (TLS)) are highly flexible. The protocol implemented should be the strongest security policy supported (e.g., mutual authentication, strong keys, sound cryptographic transforms).

Access to the management interfaces must also be defined with respect to read and write rights. Moreover, access to each management interface (e.g., entity, policy, and auditing) should be mapped to potentially different credentials. Access to one interface should not imply access to all. A master administrator should be granted read and write access all interfaces. Some consideration should be given to the means by which the master administrator should be allowed access (e.g., only from the local terminal).

9. Policy

Figure 5:
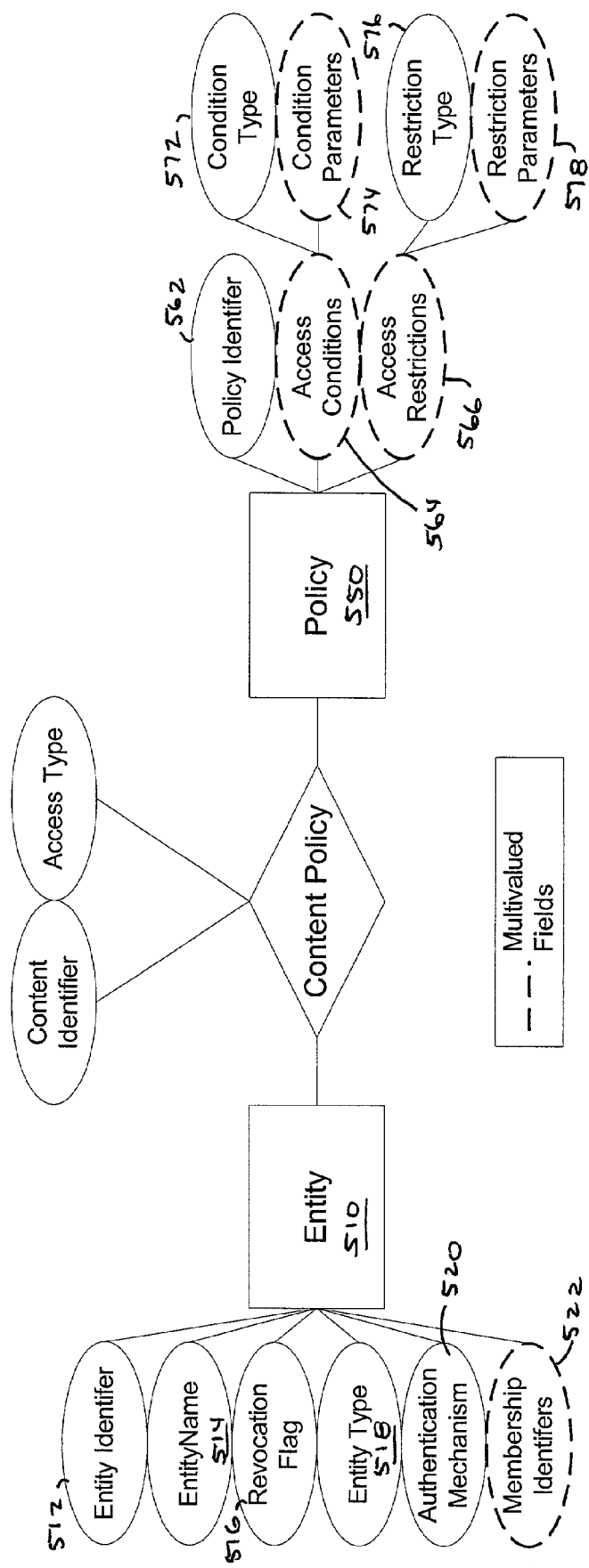
FIG. 5 is a diagram of database relationships of the proxy file management system of FIG. 1.

Policies, in the proxy file management system, define to whom and under what conditions access to protected content is granted. The policy 550 farther refines access by stating constraints placed upon the use of received content. Policy maps the relationships between the central system objects; entities, policies, and content. FIG. 5 describes the entity relationship between these policy objects. Note that the content information is stored on the file-system itself, rather than in the database.

An entity 510 is an object to which access rights and restrictions are assigned. Entities can be users or groups (or specializations thereof). Users are entities that are authenticated by the authentication framework. Groups are collections of entities. Each group can contain one or more users and groups. Hence, the organization of entities in entity database 360 can reflect the enterprise in which the proxy file management system 100 infrastructure is used (e.g., the definition of users and groups can model the hierarchy of users, departments, offices, etc.). A brief description of the entity database is presented in Table 1, which defines the characteristics of all entities participating in the proxy file management system 100 infrastructure. All external references (in other databases) to entities use the entity identifier (eid).

TABLE 1

Entity Database

| Field | Description |
| --- | --- |
| eid | Globally unique identifier 512- a byte string uniquely identifies this entity. The identifier is used as a reference handle throughout the system. |
| entityType | Entity Type 518 - this enumerated type defines the kind of entity defined in the record. The entities types are: server, user, administrator, group, and nobody. The administrator entity is a special user with the ability to modify policies. The "nobody" type defines a special group to which all users and groups in the system implicitly belong. |
| name | Common entity name 514- the name of the entity. For example, a common user may be named "Bill Smith". Groups will be assigned a name representing the defined community (e.g., Engineering, Marketing, etc.) |
| revoked | Revocation flag 516 - this flag indicates that the rights associated with this user or groups have been revoked. Any access associated with this entity will be rejected when this flag is set to TRUE. |
| authType | Authentication type 520 - this enumerated type identifies the kind of authentication appropriate for this entity. This policy states that a user must be authenticated by the identified service before they are allowed to assume the entity. Not that this implies that the same physical user or group will be represented by a distinct entity for each acceptable authentication type (e.g., Engineering/Kerberos, Engineering/RSA). |
| gid | Group membership identifiers (multi-valued) 522 - this list of identifiers (where each id refers to a entity record) identifies the groups to which this entity belongs. Note that membership is restricted to only group entities. |

Policies 550 state the conditions under which access to content is granted. These conditions identify system predicates that must be satisfied for access to be allowed. For example, administrators may wish to limit the number of simultaneous viewers, or restrict access to business hours. Policies 550 also state the restrictions to be placed on content if access is granted. Enforced by the client module 230, access restrictions further define the operations permitted by the user on received content. For example, administrators may wish to prevent printing of a document. Access condition and restrictions are designed to be extensible; the introduction of new (condition and restriction) types will not require any modification of the database. However, new management interfaces and enforcement mechanisms must be created. A brief description of the policy database is presented in Table 2, which defines the policies to be enforced by the proxy file management system infrastructure. External references (in other databases) to policies use the policy identifier (pid).

TABLE 2

Policy Database

| Field | Description |
| --- | --- |
| pid | Policy Identifier 562 - a word (e.g., four byte) uniquely identifying the policy. The identifier is used as a reference handle throughout the system. |
| name | Policy Name - a unique plain-text identifier used to reference the policy in user interfaces and auditing information. This name is assigned by the administrator during policy creation. |
| accConds | Access Conditions (multi-valued) 564 - the access conditions state the conditions under which access will be allowed. Each condition consists of:<br>a) condType 572 - this (enumerated) condition type defines the kind of condition being measured. For example the time-of-day type defines a condition that evaluates the period (as measured by wall clock time) during which access should be permitted. |

TABLE 2-continued

Policy Database

| Field | Description |
| --- | --- |
| | b) param1, param2, . . . 574 - the parameters of the condition. The interpretation of condition parameters is dictated by condType. In the above example, the parameters may be assigned as follows: param1 = 8 am, param2 = 5 pm. Hence, the condition dictates that access should only be allowed between 8:00 am and 5:00 pm. |
| accRestr | Access Restrictions (multi-valued) 566 - the access restrictions state how the client module 230 should further restrict the use of content after access is allowed. Each such restriction consists of:<br>a) restType 576 - this (enumerate) restriction type defines the kind of restriction to be enforced. For example the printable type defines a restriction that state to whom this document may be mailed.<br>b) param1, param2, . . . 578 - the parameters of the restriction. The interpretation of parameters is dictated by restType. For example, in the above example, the first parameter may be assigned to TRUE. Hence condition dictates that printing of the content should be allowed. |

Protected content is stored in the files and directories of the protected file-system (i.e., network attached storage system 160). Note that each proxy system 110 server follows the naming conventions of the exported distributed file-system interface (e.g., AFS, NFS). Hence, content is identified by the fully resolved DFS path-name. For example, (assuming an NFS interface) the file /usr/local/proxysystem.text on the server hotbox.proxysystem.com is uniquely identified by the name:

hotbox.proxysystem.com:/usr/local/proxysystem.tex

This name is used throughout the proxy file management system 100. A content identifier is a hash of this name (using a collision resistant hash function, e.g., MD5). All references to this content in the content policy database 370 use the content identifier.

Content is further organized by the hierarchical structure of the file-system, where the traditional parent/child relationships are used in the evaluation of policy. Specific to each directory and described below, the METAFILE defines the relationships between proxy file management system objects. It is this information which defines the how policies are enforced over content.

Policy Enforcement

As noted in the architectural overview, there are two distinct domains of enforcement in the proxy file management system infrastructure. The proxy system 110 content subsystem 220 enforces access policy, and the client module 230 enforces use policy. Access policies are only accessible through the management interfaces 348 (see FIG. 3). Hence, the security (e.g., confidentiality and authenticity) of access policy is determined by the facilities provided by the management interfaces 348. Use policies are communicated to the client 150 at the point at which access is given. Hence, the means by which use policies are communicated to clients must guarantee authenticity. Moreover, the delivery must be confidential to avoid exposure of potentially sensitive enterprise policy.

Access policies state the conditions under which access to content is allowed. Denial is always assumed; failure to specify a policy indicates that the entity does not have access to content. Hence, proxy file management system policies represent a closed world. This design requires all content access be explicitly stated. The advantage of this position is that errors of omission are not possible. Given the amount of information that must be managed, this conservative approach is generally preferred.

Access policies are enforced as follows. Initially, the request information (entity, content, and access types) is mapped to a set of content policies. If no such content policy exists, the request is denied. If such a content policy does exist, then the associated policy conditions are evaluated, and access allowed if all such conditions are satisfied. As dictated by configuration, information relating to the access attempt is passed to the auditing service. The enforcement mechanism performs the evaluation algorithm defined in the preceding paragraph for every group in which the entity is a member (and recursively for every group that the group is a member).

Note that there may be several content policies matching a single request. For example, where a user named Bob may be denied access, his membership in the Engineering group may allow it. Therefore, modulo acceptance, all relevant policies must be evaluated. The usage policy given to the client will be the union of those defined in all accepting policies. It is expected that protected content share a small number of policies (exhibits reference locality). Hence, the use of result caching can significantly reduce evaluation costs.

Various types of file-system semantics may be enforced or supported (e.g., Unix, CIFS, or AFS-like semantics). In accordance with such file system semantics, the read access policy is evaluated for the parent directory, and execute access policies for all parent directories from the file to the root. While this may negatively affect policy evaluation performance, it is necessary to maintain similarity with existing file-systems. Note that usage policies are not relevant to this evaluation. Hence, only one satisfying policy need be found (rather than all accepting policies).

Use policies enforced by the client module 230 define which operations may be performed by the client 150 on received content. The access restrictions in the access accepting policy (policy that allows access to the content) are communicated to the client at the point at which the content itself is transferred.

Policy Semantics

The following attempts to capture the semantic of proxy policy management system policy in algorithmic form. This section uses the following notation throughout. The set of all user entities defined in the entity database is denoted E (where $e_i$ is a single user). The set of groups defined in the entity database is denoted G (where $g_i$ identifies a single group in G). The membership of any group $g_i$ is a subset of the G and E ($g_i \subset G \cup E$, $E \cap G = \emptyset$). The set of content protected by the proxy system 110 is denoted C (where $c_i$ is a single protected file or directory). An access request $a_i$ is a combination of one or more read, write and execute rights encoded in binary form. The set of all policies is denoted P (where $p_i$ is one policy in the policy database). The set of access conditions (restrictions) of $p_i$ are denoted $p_i^d$ ($p_i^r$). The set of content policies CP (where $cp_i$ identifies one such policy) maps the tuple ($c_i$, $e_j$, $a_k$) onto one policy in P (i.e., ($c_i$, $e_j$, $a_k \rightarrow p_n$). Note that for any tuple ($c_i$, $e_j$, $a_k$), there may exist zero of more content policies. The semantics of the policy is described through the following evaluation algorithm.

Given: An access request ($c_i$, $e_j$, $a_k$), where $c_i$ is the content.
Algorithm: The conditions 1 and 2 (described below) are tested for ($c_i$, $e_j$, $a_k$) and ($g_q$, $e_j$, $a_k$), where $g_q$ is all groups in the transitive closure of $\epsilon$ from $e_j$ in G). If access is granted by some non-empty set of policies, the conditions are tested ($r_i$, $e_j$, read) where $r_i$ is the parent directory of $c_i$, and ($r_j$, $e_j$, execute) for every directory $r_j$ on the $c_i$'s path to the root. Access is granted only if all requests such are satisfied.

1. Condition 1: (Non-Revocation)
The user $e_j$ has not been revoked (as indicated by the revocation flag in the entity database). No further processing is attempted where the requesting user's rights have been revoked (no exceptions consulted).
2. Condition 2: (Policy)
There exists some content policy $cp_i = c_i$, $e_j$, $a_m \rightarrow p_n$ such that all $p_n^d \epsilon p_n$ are satisfied and $a_m \hat{} a_k$ (bitwise and—request rights are a subset of policy rights).

The usage policy is created as follows: given all satisfying policies P' for $c_i$, $a_k$ (where $u_j$ for $p_i$), the usage policy u given to the client is:

$$\bigcup \frac{k=1}{|P'|} u_j$$

The resulting usage policy is encoded and delivered to the client as dictated by the evaluation, and denial otherwise.

10. Content Storage and Communication Protocols

This section describes the format and operation of the protocols used to distribute content within the proxy file management system 100. The security of the protocols described in this section are predicated on the following assumptions. Violation of any of these assumptions may expose the proxy system 110 server to a number of attacks.

1) A known key (signified throughout as the session key) only to the authorized client 150 and proxy system 110 is established through the authorization interface 322 (see FIG. 3). This key is not exposed by either party.
2) Both the client 150 and proxy system 110 have a common source of timing information. The timing source should be sufficiently synchronized. Thus, the global time reported at any instant to each entity should not differ by more than an timing tolerance delta (δ). This implies that the clock drift must not differ significantly.
3) All cryptographic algorithms should be sound. Hence, it must be intractable to obtain plain-text from cipher-text without the encryption key, invert the collision resistant hash functions, etc.
4) An adversary may only acquire information from messages sent between the client client 150 and proxy system 110. This implies that neither the client 150 or proxy system 110 can be compromised, i.e., the back-door assumption. Note that the compromised client 150 must never be to able increase the access rights given to a compromised user.

NAS Storage Format

Files stored on the NAS storage system 160 are stored in the NAS-native file-system format in plain-text. However, encryption costs are mitigated by storing the encrypted images of recently accessed files in a proxy file management system 100 directory tree mounted off the root directory of the NAS file-system 160. This prevents the loss of data following a catastrophic failure and allows existing backup software to operate normally. Moreover, this limits the possible data loss caused by bugs in the content subsystem 220 or client module 230.

TABLE 3

METAFILE Format

| Name | Length | Description |
| --- | --- | --- |
| record-length | 16 bits | total record length |
| filename-hash | 16/20 bytes | hash of filename - not pathname |
| ownerid | 32 bits | entity identifier of file owner |
| flags | 16 bits | first two bits are encrypted bit and valid bit; others unused for now and reserved for future use |
| encryption-algorithm | 16 bits | (enumerated) identifies both the algorithm and the key length |
| key-data | 256 bits | only higher order bits contain the key; rest ignored |
| key-lifetime | 32 bits | time-stamp at which the long term should be discarded |
| initialization-vector | 256 bits | seed initialization vector used by the encryption algorithm. Multiple IVs are used to allow random access to the file. |
| unused | 20 bytes | (for any future needs) |
| number-of-policies | 16 bits | number of policy definitions to follow (designated as in the following field |
| policy tuples | bits | 32 bits of gid and 32 bits of pid (values from entity and policy databases). |

Each directory on the NAS maintains a single file (e.g., METAFILE) describing the information associated with the files of that directory. The METAFILE is stored in the plain-text directories and includes a single record for each file. The METAFILE record format described in Table 3 above, wherein each field describes the policy and recent keying information for stored protected content. Note that associations between policies and files are recorded in the policy tuple fields.

Files are (re)encrypted at the block level at the NAS with a new key when they are first accessed or following a change in policy or access rights. The (encrypted) blocks are transmitted without any subsequent encryption to the client. The key used to encrypt the file is distributed to the client as defined by the file payload, as discussed below. To simplify, 1) Each file is encrypted by a long term key that is invalidated following a change in policy or when the long term key lifetime is reached (stored in the METAFILE).
2) Invalid keys are replaced and the file re-encrypted on access.
3) The long term encryption key delivered to clients under the session key at access time through the file key payload.

For reasonable-size directories, the length of the METAFILE is expected to be no more than one or two blocks. Hence, updating the policy for all files in a directory should be very fast (<20-30 ms or so at current disk speeds). Doing a recursive update for the entire file system will take longer, depending on the depth of the recursion. However, this cost should be within a reasonable factor of doing recursive chmod. A record for each sub-directories is maintained in the parent directory METAFILE (or in itself for the root directory). The only important information about a directory is the access policy information (i.e., usage policies are not meaningful).

On a file creation, the METAFILE will automatically inherit the policies of the parent directory. The {gid, pid} tuples will be copied into the new record for the file. The encryption key is invalidated on any change of policy on a file by clearing the valid bit). The file is re-encrypted by the proxy system 110 and a new key installed in the record for the file on subsequent access (rather than immediately). The records need not be sorted as memory operations are fast and the METAFILE is expected to be 1 or 2 blocks. Disk access time dominates any memory operations.

The cipher modes (e.g., CBC) used in encryption require that all bytes prior to requested plain-text be decrypted. Hence, operations such as fseek( ) may require that the entire file be decrypted to recover the plain-text. This is stark contrast to the performance needs of clients. The following construction is used to mitigate these costs by encrypting each proxy system 110 block independently;

1) Each file is separated into blocks of size $b_f$ (where $b_f$ is a configured block size stored with the file. So, a file f that contains blocks $f_0, f_1, \ldots, f_n$, where n is $\lceil |f|/b_f \rceil$.
2) The initialization vector $iv_f$ assigned at key creation time. The initialization vector for each block is calculated by XORing $iv_f$ with the block number. Hence the ivs for the blocks of f are $(iv_f \oplus 0, iv_f \oplus 1, iv_f \oplus n)$. Because $iv_f$ is constant, and the block number is unique for each block, each block will have a unique initialization vector.

Message Transform

Any of a variety of secure transforms known in the art may be used with the proxy file management system, such as IPSEC and SSL, as examples. Alternatively, the following "lightweight" transform may be used, which allows for greater bandwidth management than those known in the art.

Figure 6A:
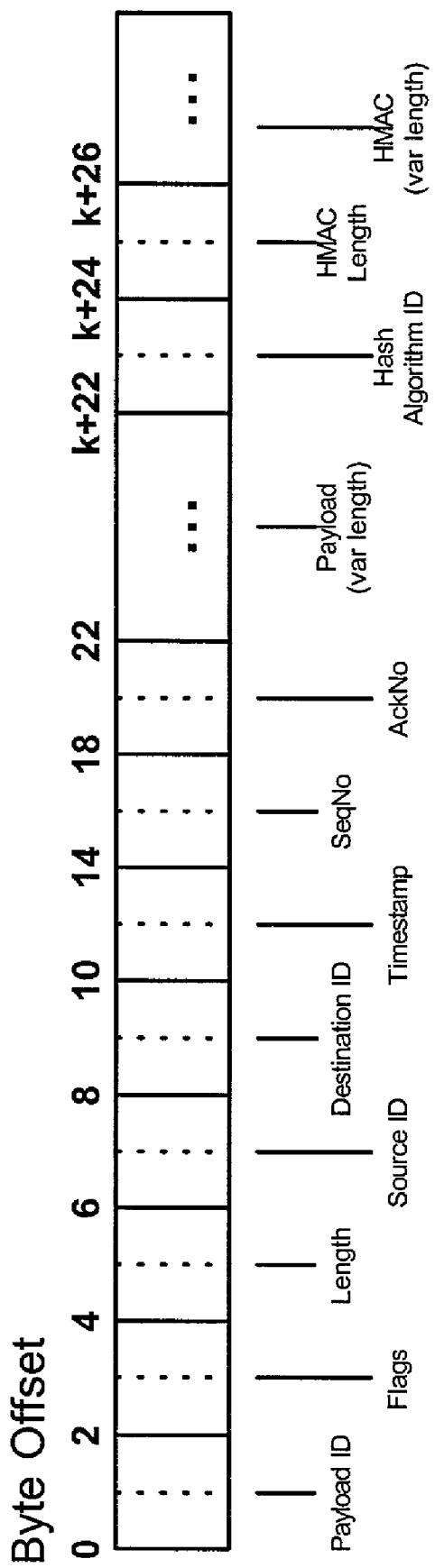

Shown in FIG. 6A, the proxy file management system 100 content transform 600 provides sufficient context to determine the freshness, integrity and ordering of a client or server message. All communication between the client 150 and proxy system 110 use the content transform 600. This transforms encapsulates the security and contextual information needed for communication between proxy file management system entities. The purpose of the single transform is to simplify processing; each new message is processed by the single transform processor. FIG. 6B describes the fields of the message content transform.

Note that the file-system data is encapsulated in the message payload field. This field is treated as opaque data throughout this section. The following section describes the format and processing of the different payloads. A further advantage of this approach is that the authenticity and integrity of a message can be assessed with knowledge of the semantics (payload type). This increases the speed with which proxy file management system software can discard invalid messages. The following describes the input and output processing of the message content transform.

The delivery guarantees provided by IP (e.g., UDP, TCP) are not secure. Hence, the transport layer must provide both ordering and reliability guarantees. This is accomplished through a sliding acknowledgment window protocol supported by the sequencing fields of the content transform (i.e., SeqNo, AckNo).

Message Output Processing

1) The payload, flags, SeqNo, AckNo, source, destination, and time-stamp are filled into the message.
2) The time-stamp is acquired from the local timing source and placed in the time-stamp field.
3) The payload data is acquired from the appropriate source. Further processing of the payload is performed as dictated by the flags. Where multiple flags are set, they are perform in the order stated below.
   a) Signature Flag—indicates the payload has been signed by the source.
   b) Encryption Flag—where encryption is enabled, the payload is encrypted as follows: the initialization vector is calculated by truncating a hash of the concatenated time-stamp and source identifier (the hash algorithm used is identifier in the hash algorithm id field). For example, IV=h(sid, ts). The entire payload is encrypted under the calculated IV and the session key shared by the source and destination.

The result of the applied transforms is placed in the payload field. Where no transform is applied, the plain-text is placed in the payload field.
4) The hash algorithm id is placed in the appropriate field.
5) An keyed hash is calculated using the construction defined in RFC 2104. This construction calculates the HMAC using session key shared by the source and destination and hash algorithm identified in the algorithm field. All bytes preceding the HMAC length field are used as input to the HMAC generation. The length and HMAC value are placed in the appropriate fields.
6) The completed message is transmitted to the destination.

Message Input Processing

1) The payload ID, flags, length, SeqNo, AckNo, source and destination IDs, hash algorithm and HMAC length fields are extracted from the message and validation. If any field contain an invalid value, the message is ignored.
2) The time-stamp is extracted from the message (denoted $m_s$). A message is ignored if the following relation is true (where $\delta$ is a message reordering tolerance, $\epsilon$ is a clock skew tolerance, and c is the current time reported by local timing source);
   a) $l_s - m_s > \delta$
   b) $|m_s - c| > \epsilon$
These tests validate that no previously message is accepted beyond the configured clock tolerances.
3) An HMAC is calculated over all fields through the last byte of the hash algorithm ID. The result is compared to the transmitted value, and the message is rejected where the values are not identical.
4) The payload is extracted and the reverse payload transforms are performed. If properly formed and processed (e.g., decrypted correctly, signature validated), the resulting payload data is then passed to the payload processing software.
5) If the payload is properly processed, the received timestamp is recorded in the last received timestamp state variable.

Payload Formats

Payload data encapsulates the file-system communication between the client 150 and proxy system 110. Note that payload data is obtained only from the successful completion of the transform input processing defined in the previous section. Payload data is driven by the (authentic) payload designator of the transform. This information is passed to the payload processing software, and further processing of the payload types is defined in the following subsections.

Figure 7:
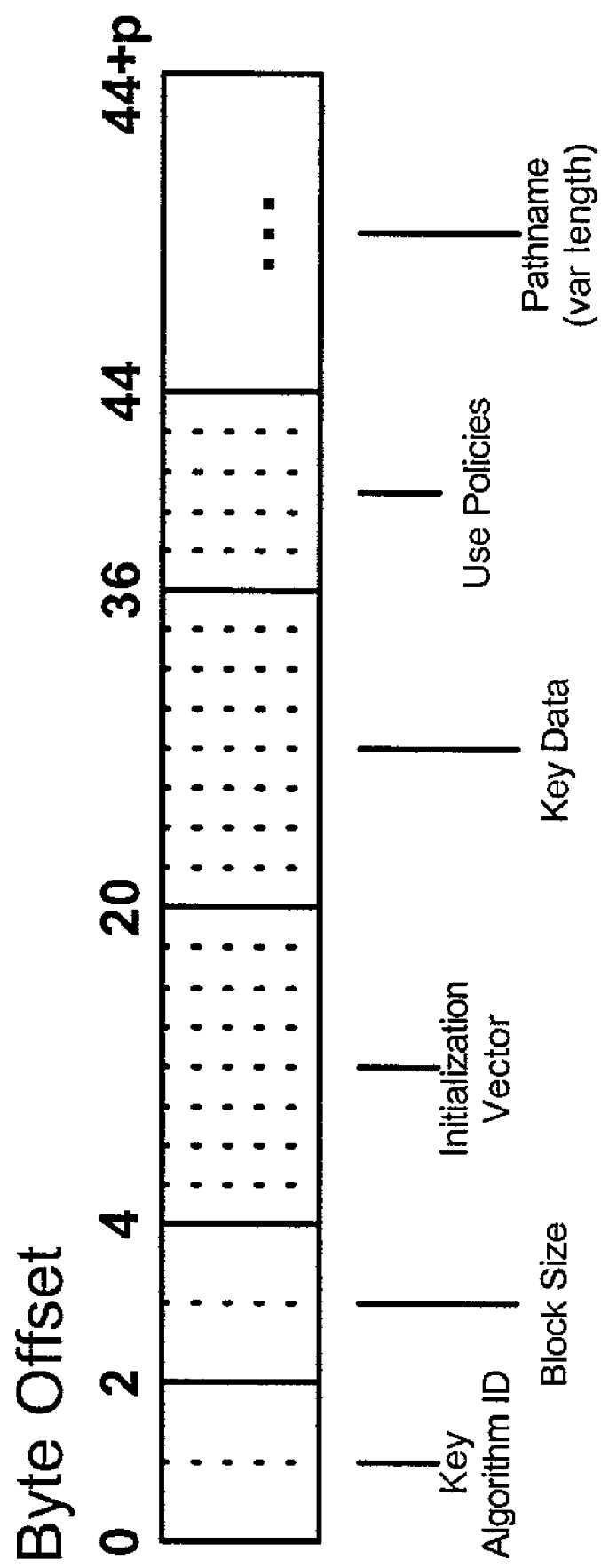

1) File Key Payload Format (AERE_FILE_KEY)
The file key payload communicates the file and policy information associated with an accessed file. Sent following a file open( ) call, this transform gives sufficient information for a client to recover the file plain-text from encrypted file blocks. Note that this transforms requires that the encryption flag in the message transform be set. Failure to set this bit would result in the exposure of the key data, and indirectly expose the protected content. FIG. 7 and FIG. 8 depict the transform contents.

2) Block Format (AERE_BLK_XFER)
The block transform is used to transfer file blocks between the client and server. Each block is delivered to the transport layer in encrypted format. Hence, it is not necessary to encrypt the data for transfer. The integrity and authenticity of each block is guaranteed by the encapsulating content transform. The fields of the block transform are detailed in FIG. 9.

3) Status Transform (AERE_STATUS)
Status transforms are used to communicate state changes and debugging information between clients 150 and proxy system 110. Status messages are used as a signaling protocol between clients 150 and proxy system 110 server (i.e., to communicate proxy file management system infrastructure events). Hence, these transforms are used independently of the distributed file-system protocols, each of which contains is own signaling mechanisms. The fields of the status transform are detailed in FIG. 10.

11. Alternative Embodiment

In addition to, or as an alternative to, the proxy file management system described above, a dynamic file access control and management system in accordance with the present invention may be configured to provide a mechanism for modifying computer files in real-time as the files traverse a server in a network, such as the Internet. In such a case, the present invention may act as an intermediary between traditional web servers and an digital content. This allows businesses to easily upgrade to different types of content delivery, while continuing to utilize their current content delivery infrastructures, without converting proven systems to new technologies.

In this embodiment of the present invention, called a dynamic content management system (DCMS) includes software that runs on a server computer (or "cluster" of server computers) and operates between HTML or WAP or FTP server software (or additional, required software and protocols), and content, digital rights warehouse, and database software. This allows the DCMS to interface with existing systems, with minimal interruption.

The present invention modifies files sent across networks in real-time. When a client machine requests a file from an HTTP server (such as Apache or IIS), the request is routed to an dynamic content management server, whereby the file is retrieved, encrypted (optionally), rules are applied, and then the requested file, along with the "other" information wrapped with the file, is sent to the requesting client. For example, if a musician wants to sell his/her music online, that person can choose the file format they prefer (e.g., MP3, WMA, ePAC, etc.) and simply instruct the dynamic content management server to securely distribute the file under a specified set of rules. This removes the trial and error associated with encryption and encoding in conventional systems.

Figure 18:
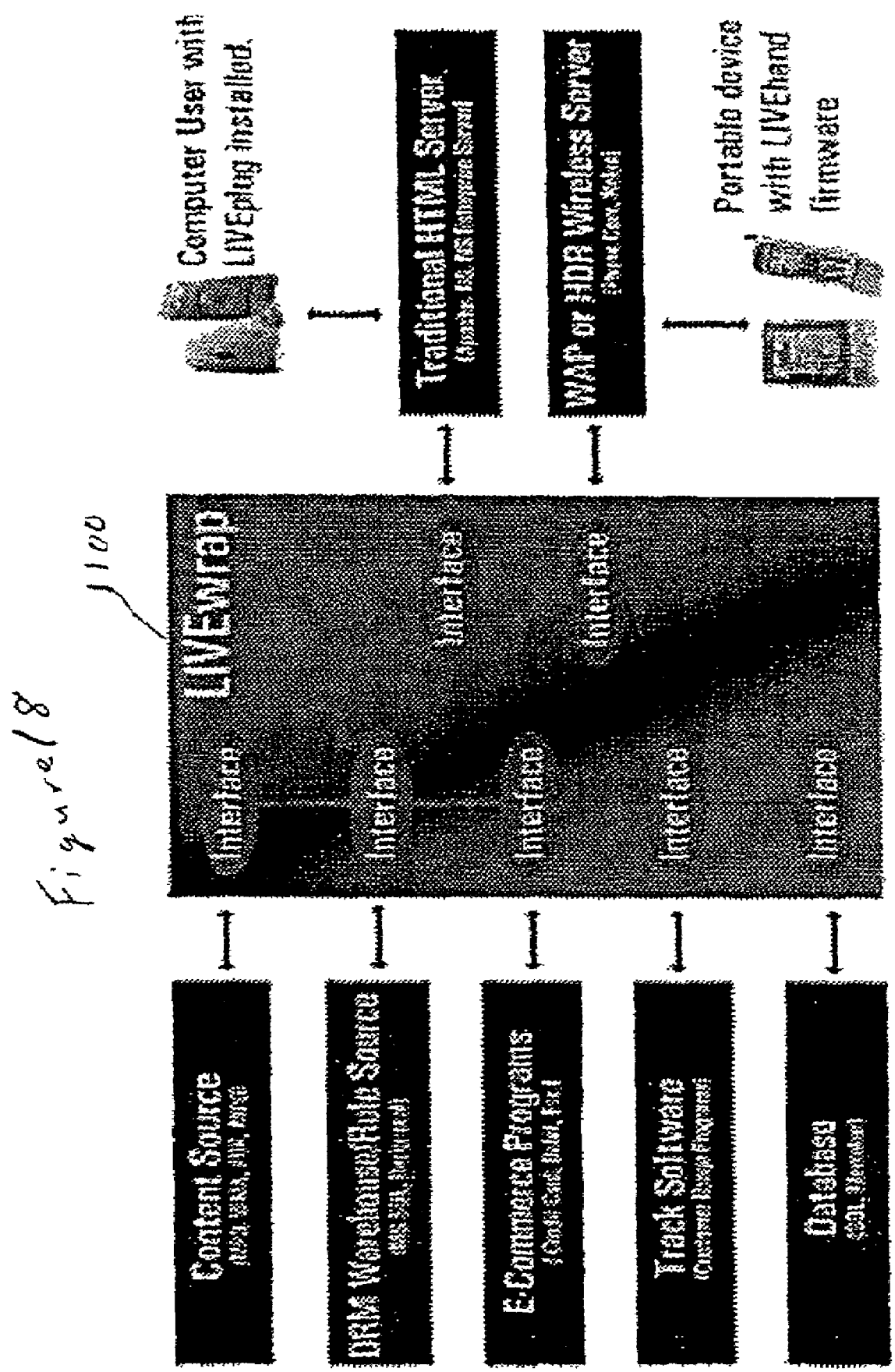
FIG. 18 shows the use of client-side plug-ins that are used to read DCMS-enhanced file, in accordance with an aspect of the invention.

The delivery of digital files is a multi-layered process, and does not occur in a vacuum. Recognizing this, the DCMS is flexible, interfacing with existing enterprise software. The dynamic content management server offers gateways such as: content, digital rights management (DRM) warehouse, e-commerce, database, LiveEmbed™ module (a trademark of Aereous, LLC of Ann Arbor, Mich.) and client tracking/customer relations management (CRM) software (see FIG. 18, for example). The content gateway allows the dynamic content management server to accept and modify content from a variety of different sources, over a number of standard protocols, including but not limited to: HTTP, FTP, and networked sources. The DRM warehouse gateway interacts with current service provider's warehouse solutions. The e-commerce gateway allows for secure purchases to be made over the Internet, and for content owners to be compensated for those purchases. The database gateway provides connectivity to SQL and ODBC databases, and the client tracking/CRM software gateway provides for the tracking and collection of information related to purchases made by a client, as well as recommendations for future purchases.

When an end-user receives a file which has been "wrapped" by the DCMS, the user can open it with an application that is compatible with the end-user's native operating system, provided that the dynamic content management client software has been installed on the end-user's device. The end-user can only use the file in a manner defined by the rules that have been sent by the file's creator (or administrator). These rules can specify a variety of different variables, such as the number of playbacks (or openings of the file), whether the file can be transferred to portable devices, and whether the file will ever "expire" (e.g., file cannot be accessed after a particular day and/or time of day). These rules are stored on (or accessed by) the dynamic content management server or servers, and are attached to the file ("wrapped") at the time of download, as part of the dynamic content management server process. Thus, the DCMS lends itself to all areas of secure media distribution where privacy, copyright, bandwidth management, additional revenue streams and/or financial protection are required.

The DCMS is installed between existing clients and servers, essentially creating a "pass-through" server that adds a step in the process of requesting and receiving data over the Internet.

A first component of the DCMS exists on the server side. In particular, on the server side, the DCMS works with an existing data (or content) server to intercept and interpret requests for data without the explicit knowledge of either the client or the data server. When a request is made and the original data server attempts to read the requested file from disk, a transparent operating system modification on the original data server detects that read attempt and forwards the request for data to the dynamic content management server. The dynamic content management server then retrieves the data from a content server and sends back to the data server the original data embellished with additional content in a known format and structure. The added content may be context-sensitive and may vary from request to request, depending upon information known about the requesting client, time of day, request number, or any number of other possible factors.

Upon receipt of the original data embellished with the additional content, the original data server will reply to the client with the modified data file as provided to it by the dynamic content management server.

A second component of the DCMS exists on the client side, since the originally-requested data file now has additional content that could not be understood by the requester. Therefore, the DCMS on the client side is a component on the client's computer, which intercepts and interprets the dynamic content management specific data and removes it from the data stream, thereby feeding "clean" data to the client and using/displaying the additional, context-sensitive data in its own manner. In the present invention, there is provided a direct channel of communication between the dynamic content management server and the dynamic content management client component, so that when a client requests data, the dynamic content management server will be made, aware of whether or not the client is capable of receiving and interpreting the additional data.

Another component of the DCMS are interpreters for the additional dynamic content management supplied data. In some cases, the standard operating system extensions and common programs may be used as the display vehicle (for example, most systems have a default application for displaying bitmap BMP files). In others, a custom display and/or playback module may be employed. This module would be installed at the client's computer along with the dynamic content management client software when the client detects that it is required.

An example of the use of the DCMS to obtain an audio file will be provided herein. An Internet user enters a music site and browses a catalog of available music samples. The user finds a selection that he/she would like to hear, and starts to download the selection. The user's client program (the browser) requests the MP3 file (or other type of file) from a content server. The content server in turn attempts to deliver the file to the requesting client.

At this point, a DCMS patch to the content server-side operating system detects and intercepts the attempt to open the file by the content server. This patch, which is an extension to the server-side operating system, communicates the request to a DCMS server for processing. The DCMS server then attempts to contact the client directly to ensure that the client has the appropriate DCMS software at its end (e.g., to determine if there is a DCMS patch to the client-side operating system). If the client is not capable of interpreting DCMS information, one of two things may happen: either the DCMS server could process the request and send the MP3 file to the client anyway with no additional information, or it may refuse the request and instead send back a HTML page (or other such mark-up language or communications implement) that explains why the request was denied (and how to obtain the necessary DCMS client patch from the Internet). The choice of which to do is up to the owner of the content, and is stored at the DCMS server's database for each content server that can be accessed by the DCMS server to provide content to a client.

Assuming that the DCMS client patch is installed, the DCMS server reads the actual data file from the content server's storage, and holds it in a temporary location or in memory. Then, the DCMS server calculates what additional content, if any, is to be included with the file, and merges the two or more data streams appropriately. For example, the DCMS server may determine the location of the client (or requestor), search a database of music stores in the area currently running specials on the selected band's CD, and if one or more are found, append visual ads or coupons as BMPs to the MP3 sample file requested by the client. That way, when the client receives the MP3 sample file that he/she requested, the DCMS software at the client's computer parses the additional dynamic content management-added information to display the "coupons and specials" information to the client on the client's monitor, when the MP3 file is played. In addition, one or more hyperlinks to related web sites may be provided so as to be displayed when the MP3 sample file is played by the client's computer. The DCMS server replies to the operating system patch on the client's side, by providing the client with a modified data file, which is sent to the client to fulfill the client's request.

At this point, the client system receives and saves the DCMS-modified file to disk as though it were a valid MP3 file, when in fact the format has been modified by the DCMS. Then, when the client attempts to open the file to play it, an OS patch on the client side detects the "attempt to open" action and passes the request along to the DCMS client program (stored at the client's computer) for processing. The DCMS client program reads and interprets the modified MP3 file, and displays the included BMPs (and/or hyperlinks) if present. At the same time, the DCMS client program strips the DCMS data from the MP3 file, and decrypts it (if it had been encrypted by the DCMS server), and passes "clean" MP3 back to the client program (e.g., Quick Time™ or Real Player™) which attempted to open the file.

In one example of how this can be done, at the client side, the Microsoft OS kernel called kernel32.dll is modified and code is added which detects when particular types of files are being opened at the client's computer. This detection triggers a DCMS dynamic linked library (DLL) on the client computer to read the file being opened and to process it in order to determine what to do to that file. The modification to the kernel and the incorporation of the dynamic content management application program at the client's computer is done when the client adds the DCMS capability to his/her computer, such as by downloading software from a particular Web site in order to be able to open DCMS-enhanced files.

The DCMS has many advantages. One advantage is its seamless implementation. Once installed, the DCMS operates "seamlessly", and does not require the user to run a specific program or keep an application open for it to work. The DCMS behaves as an extension to the operating system itself. Another advantage is that no server-side data file changes are needed. Given the nature of the DCMS, an existing data server does not need to "encrypt" any of their data files prior to use. In fact, merely installing and configuring the DCMS software gives the server the appearance of holding nothing but encrypted files without actually modifying a single data file. This enables files such as e-mails, which are not stored on a server until they are created, to be modified automatically.

Yet another advantage is that the client-side data is always wrapped. Once a data file is protected by the DCMS and is sent to the client, it exists on the client's PC as a protected or DCMS-formatted file. Access to the file can be limited (as defined in each individual file instance, by the data owner) to a DCMS-capable system at the client side. Still another advantage is the capability of context-sensitive information, LiveEmbed™ module. File requests can have additional information attached to them (by the DCMS server) so that the information is displayed whenever the user accesses the requested file. This information can be different for every download of the file (e.g., time-of-day or time-of-year dependent).

The DCMS utilizes an OS-level modification at both the client and at the content server side, so that certain actions at both the client and the server side are captured and thereby require actions to be performed by the dynamic content management server.

FIG. 11 shows the flow of data in a standard client-server environment, where information is sent from a server 1150 to an application 1152 that requested information from the server 1150. The information is transferred using a server native protocol. FIG. 12 shows the flow of data in a client-server environment that utilizes the DCMS. In FIG. 12, the information requested by the application 1152 is sent by the server 1150 to the DCMS server (or LiveWrap™ server, also a trademark of Aereous, LLC) 1100, which sends the requested information, along with other information wrapped with it, to a DCMS client 1110 (i.e., LiveWrap™ enabled), where the requested information is provided to the application 1150, and where the other information is provided to a LiveWrap™ Extra Content element 1120 to be displayed on a display by way of LiveWrap™ Extra Content Display Program 1130, and where that other information may provide rules by which the requested information can be used by the application 1152. FIG. 12 also shows that the application 1152 communicates with the client 1110 using a server native protocol, and whereby the dynamic content management server 1100 communicates with the content server 1150 using the server native protocol. However, between the client 1110 and the dynamic content management server 1100, a different, non-server native protocol is used, for enhanced security reasons.

Figure 13:
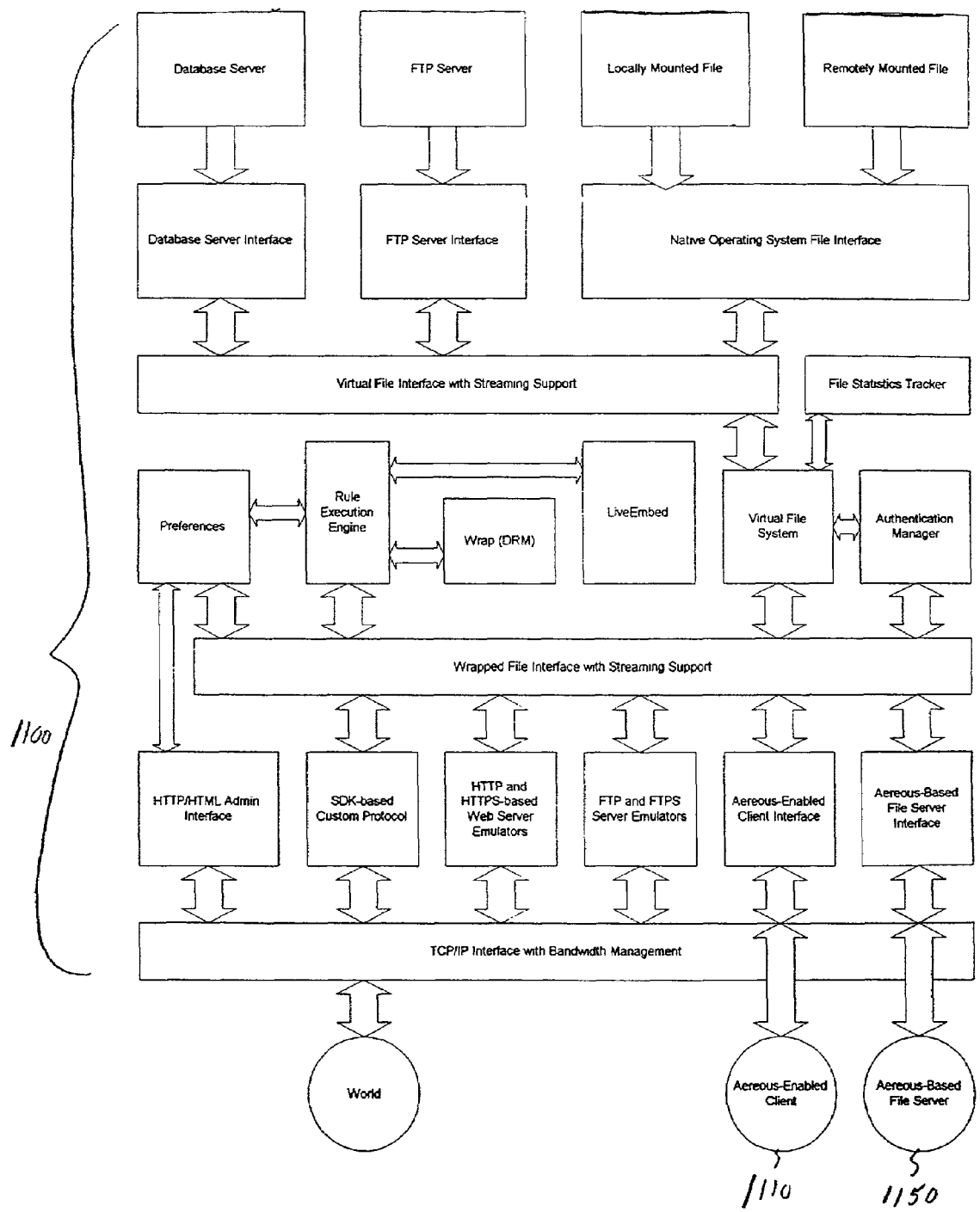
FIG. 13 is a system-level diagram showing the objects of the DCMS Server in accordance with an embodiment of the invention.

FIG. 13 shows a system-level diagram of the objects that are utilized in the preferred embodiment of the DCMS.

Figure 14:
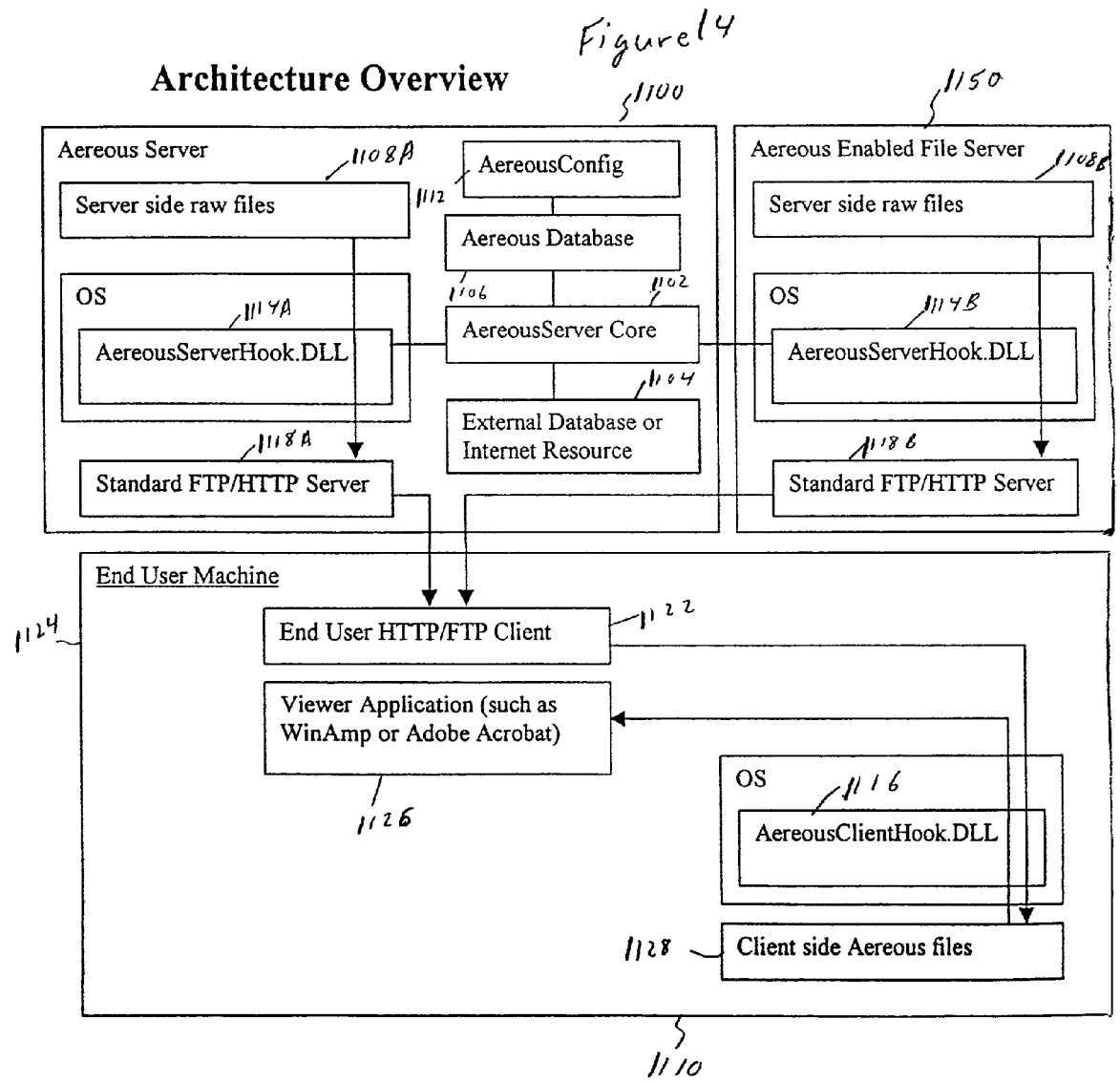
FIG. 14 is a diagram of an overall architecture of the system of the invention, in accordance with an embodiment of the invention.

FIG. 14 is a diagram of a representative overall architecture of the DCMS, showing the end-user machine (i.e., client) 110, the DCMS-enabled file server (content server) 1150, and the DCMS server 1100.

The elements of FIG. 14 are described in detail below.
1) DCMS Server 1100—A dynamic content management server that hosts both an off the shelf file server and the server core 1102 (also called "application core").
2) DCMS Enabled File Server 1150—A DCMS enabled file server that hosts an off the shelf file server that connects remotely to the server core 1102.
3) DCMS Server Core 1102—A TCP server that helps the DCMSServerHook.DLL build files from virtual file paths.
4) External Database or Internet Resource 1104—Used by DCMS Server Core plug-ins to generate dynamic virtual files.
5) DCMS Database (1106)—Stores usage statistics, which files are marked for DCMS encoding, push content information, and file usage restrictions.
10) Server side raw files 1108A, 1108B—The raw (i.e., not DCMS-encrypted) files. In the present invention, the file server stores raw files since this enables a server administrator to switch to and from dynamic content management technology without having to maintain separate sets of files.
11) DCMSConfig 1112—ASP application that configures database 1106.
12) DCMSServerHook.DLL 1114A, 1114B—Server side Win32 file hooks. These hooks convert virtual files to complete dynamic content management files that get sent to the client. The file data can be obtained from corresponding raw files on the server or they can be obtained completely through the DCMS server core 1102. The second case will be used for files that are completely dynamically generated.

13) DCMSClientHook.DLL 1116—Client-side Win32 file hooks. These hooks deliver push content, enforce usage restrictions, and supply end user applications with the raw data from a DCMS file. Typically, these hooks are invoked when a standard end-user viewing application opens a DCMS file.
14) OS—This refers to the standard Win32 API functions (alternatively, other types of operating systems may be used with the present invention, including but not limited to Linux or Unix).
15) Standard FTIP/HTTP Server 1118A, 1118B—A standard off the shelf FTP/HTTP server. This server does not know about dynamic content management server and does not require any DCMS extensions to work properly.
16) End User HTTP/FTP Client 1122—A standard FTP/HTTP client that does not need any DCMS specific extensions to get DCMS files.
17) End User Machine 1124—A client machine of the DCMS for downloading DCMS files.
18) Viewer Application 1126—A standard viewing application such as WinAmp (for MP3s) or Adobe Acrobat (for PDF files).
19) Client-side DCMS files 1128—The DCMS files that the end user downloads.

The DCMS file format provides the following functionality:

1) Streaming Support—DCMS files are broken up into separately encrypted blocks of data. This supports streaming when using certain encryption/compression algorithms that require an entire block before being able to reproduce the original data.
2) Expiration Dates—Push content supports expiration dates for items that are only relevant for a finite time. An entire file may also have an expiration date associated with it.
3) Flexible Content—The dynamic content management client delivers content to the user when a license has expired or as push content. In the preferred embodiment, only one content type is defined: a basic URL. Note, however, that additional content types may be used, including types that use customized content delivery applications and customized web browsers.
4) Transparent—For certain file formats, the DCMS encoding is transparent to clients that do not have the DCMS software installed. The file is encoded, in such a way that a standard file viewer would see special fake data instead of the encoded data. This special data would notify the user that the DCMS software is not installed. This transparency will only work for a limited number of formats but any format can still be encoded.

This format is not modified once it is written. The only time the DCMS file is modified is to decrement usage counts.

Because of the requirement to provide functional data to client systems that do not have DCMS software installed, the DCMS header is not necessarily located at the beginning of the encoded file.

All multi-byte fields are represented in big endian (MSB) byte order.

TABLE 4

Multi-byte Fields

| Description | Size (bytes) | Contents |
| --- | --- | --- |
| DCMS Signature | 11 | 'DCMS' + 001301976 |
| DCMS File Version | 1 | Currently 0x1 |

TABLE 4-continued

Multi-byte Fields

| Description | Size (bytes) | Contents |
| --- | --- | --- |
| File ID | 8 | File's DCMS ID. |
| Usage Count | 2 | Number of usages remaining. Set to 0xFFFF for infinite usages. |
| Expiration Date | 4 | A GMT ANSI RTL style time date stamp that indicates when this file expires. |
| Usage Denied Content | Varying | Once a read attempt fails due to a 0 usage count, this content is displayed to the user. The format is described below under "Content Format" |
| Number Of Push Content Items | 2 | Number of items that are pushed to the user when the file is opened. |
| Push Content Items | Varying | Array of push content items. The format is described below as "Push Content Item Format". |
| Header CRC | 4 | A CRC value for the preceding header bytes. |
| Content Size | 8 | The size of the unencrypted data |
| Encryption Type | 1 | 0 = Unencrypted; 1 = 2Fish; 2–255 = undefined |
| Encrypted Data Offset | 8 | A file offset to the beginning of the encrypted data. The encrypted data uses the format described in "Encrypted Data Block". |

Content Format

TABLE 5

Content Format

| Description | Size (bytes) | Contents |
| --- | --- | --- |
| Content Type | 1 | 0-Error; 1-URL; 2-255-Undefined |
| URL (for URL Types) | Varying, | 2 byte count prefixed string containing the URL. |

Push Content Item Format

TABLE 6

Push Content Item Format

| Description | Size (bytes) | Contents |
| --- | --- | --- |
| Repetition Count | 2 | Number of times that this content will be sprung before expiring. 0xFFFF means that this will never expire due to use. |
| Expiration Date | 4 | A GMT ANSI RTL style time date stamp that indicates when this content item expires. Set to 0 for no date expiration. |
| Content | Varying | Indicates the content to be pushed to the user. The format is described in "Content Format". |

TABLE 7

Encrypted Data Block

| Description | Size (bytes) | Contents |
| --- | --- | --- |
| Encryption Block Size | 4 | Bytes of encrypted data under the current encryption block. Each block can be decrypted independently of other blocks. Data within a block can't necessarily be decrypted without preceding inter-block data. |
| Pure Content | Varying | An encrypted block of the original file's pure content. |

The DCMS has its own system of referencing files separate from the system used on individual file servers. This is the case because:

1) Many file servers can be connected to one server core. Each file server might store its files intended for DCMS distribution at different local locations.
2) Some of the content to be distributed over DCMS does not come from a static file but is dynamically generated from a database or other source. In this case there will be a virtual DCMS file path without a corresponding file server file.

Local file server paths are converted to and from DCMS virtual paths by the DCMSServerHook.DLL 114A/B file hooks. This is done using mapping information stored in the Windows™ registry.

In the preferred embodiment, the DCMS server core 1102 is a TCP server that determines if and how a DCMS file should be built given a virtual path name. Regular static files are encrypted straight from the corresponding raw file on the file server and combined with header information obtained from the DCMS server core 1102. Dynamic files are completely acquired from the DCMS server core 1102, which will do the encryption in addition to building the header data.

Classes
1) CoreListener
2) CoreServer Thread—There will only be a small number of these (possibly even only one) that service a list of sessions. This is to better handle high volume conditions where a thread for each session would invoke too much overhead.
3) CoreSession—The foundation of the state machine. There will be one instance of this for every connected server hook. This will contain many functions with many states. All TCP receiving and sending are done through states.

The DCMS server core 1102 builds the header information for all files. This includes a file ID, push content information, licensing restrictions, and encryption method. Instead of having this information stored for each file in the database, a more flexible rule engine is to be used.

Figure 15:
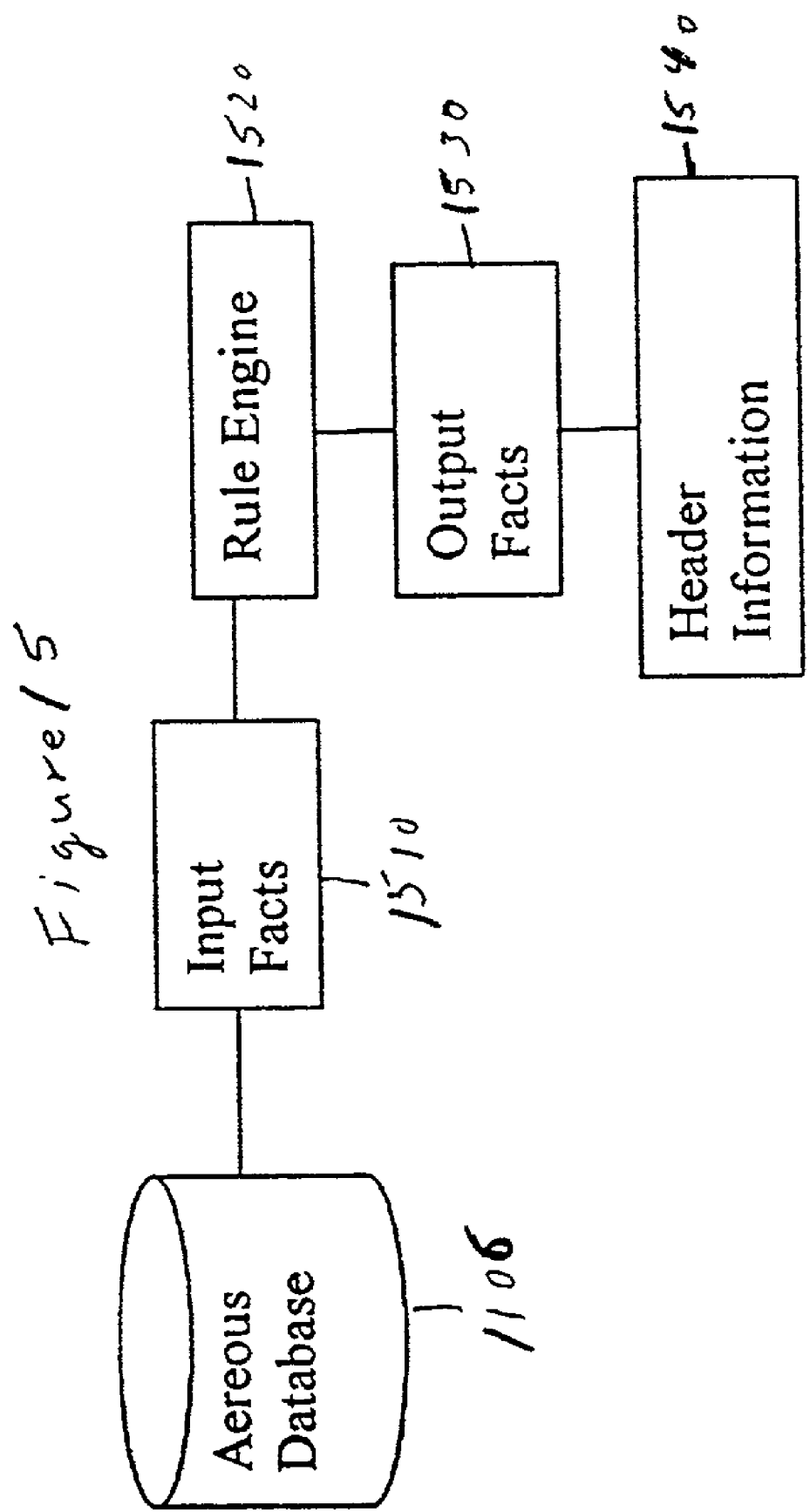
FIG. 15 shows the steps in which information stored in the DCMS server database is converted to header information, in accordance with an aspect of the invention.

FIG. 15 shows the steps in which information stored in the DCMS database 1106 is converted to header information to be provided in a DCMS-wrapped file.

1) Input Facts 1510—Static information stored in the database. The facts that are supported can be adjusted depending on the kind of dynamics needed.
2) Rule Engine 1520—In the preferred embodiment, this is implemented as static C++ code linked into the DCMS server core 1102 code. If additional flexibility is needed, a determination can be made of the kind of additional rules that are necessary and an interpreted mini-language can be built to support them.
3) Output Facts 1530—The output of the rule engine. These facts are converted to header information.
4) Header Information 1540—The DCMS file information that DCMS server core 1102—sends back to the DCMSServerHook.DLL.

The DCMS server hook 1114A/B to server core protocol is now explained. In the preferred implementation, all transactions begin with a 2-byte command identifier. All multi-byte fields are stored in big endian (MSB) byte order.

GET_DCMS_GENERATION_TYPE

Get the information for building a DCMS file from a virtual path name.

TABLE 8

Request Fields

| Description | Size (bytes) | Contents |
| --- | --- | --- |
| Command ID | 2 | 0x1 |
| File Name | 2 | 2-byte count prefixed string containing the virtual file path name. |

TABLE 9

Response Fields

| Description | Size (bytes) | Contents |
| --- | --- | --- |
| Generation Type | 1 | 0 - Not an dynamic content management virtual file.<br>1 - Static DCMS File. Build the DCMS file from a corresponding raw file on the file server. Header information will be needed.<br>2 - Dynamic DCMS File. The entire file will need to be acquired through Server Core (which will acquire the raw data through a plugin). |

BUILD_DCMS_HEADER

Build the DCMS file header containing proper usage count, expiration date, and push content settings for a given DCMS virtual file path. This is not supported for dynamic files since they should be acquired with GET_DCMS_DYNAMIC_FILE.

TABLE 10

Request Fields

| Description | Size (bytes) | Contents |
| --- | --- | --- |
| Command ID | 2 | 0x2 |
| File Name | Varying | 2-byte count prefixed string containing the virtual file path. |

TABLE 11

Response Fields

| Description | Size (bytes) | Contents |
| --- | --- | --- |
| DCMS Header Size | 2 | The size of the following DCMS file header. |
| DCMS Header | Varying | The actual file header. |

GET_DCMS_DYNAMIC_FILE

Gets the entire DCMS file from a given virtual file path. This command does not work with static files.

TABLE 12

Request Fields

| Description | Size (files) | Contents |
| --- | --- | --- |
| Command ID | 2 | 0x2 |
| File Name | Varying | 2-byte count prefixed string contain in the virtual path name of the dynamic file. |

TABLE 13

Response Fields

| Response Description | Size (bytes) | Contents |
| --- | --- | --- |
| DCMS File Size | 2 | The size of the following DCMS file. |
| DCMS File | Varying | The file contents. |

Figure 16:
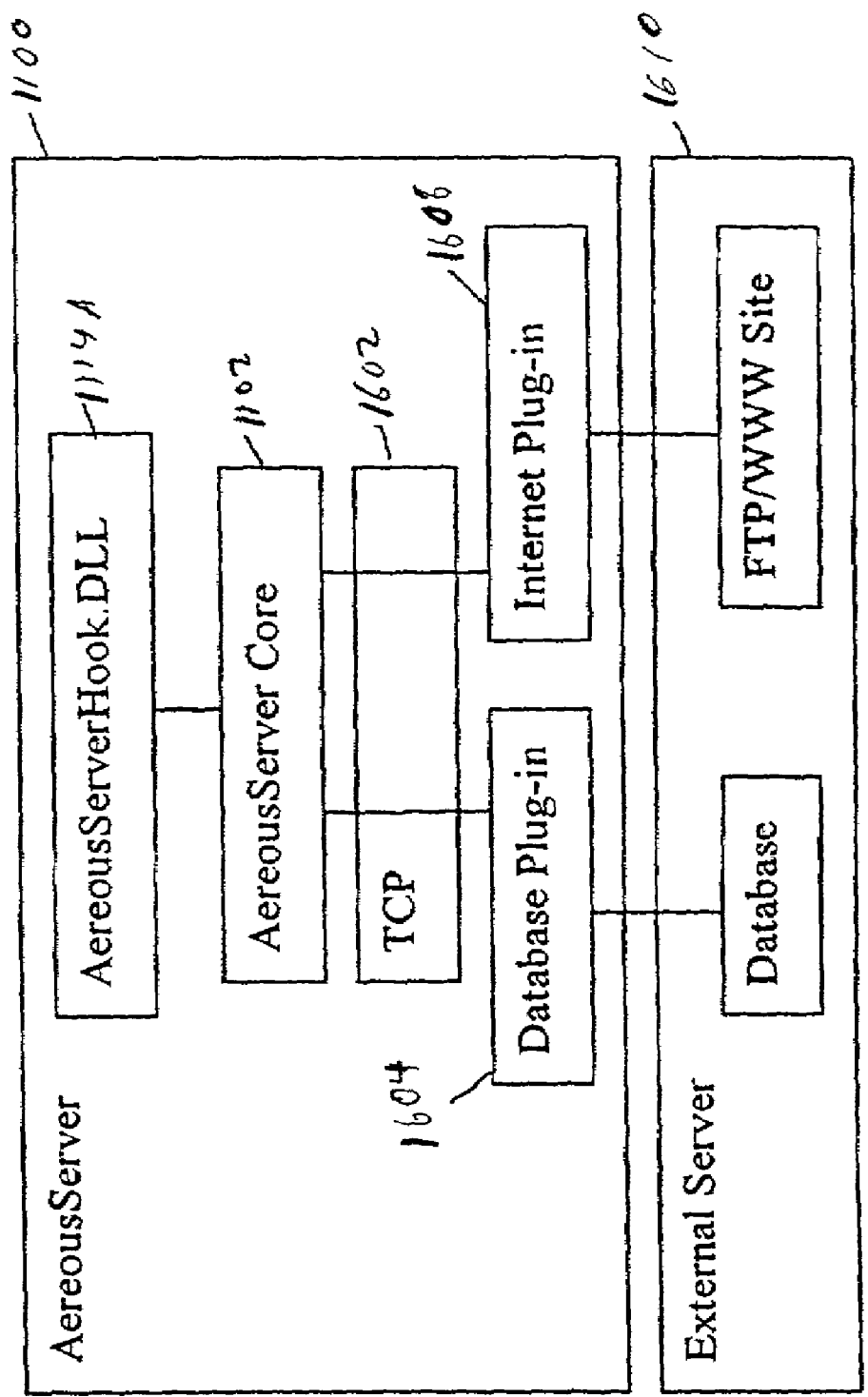
FIG. 16 is a block diagram of the DCMS server core plug-in architecture, in accordance with an embodiment of the invention.

The DCMS Server Core Plug-in Architecture is shown in FIG. 16. The elements of FIG. 16 are described in detail below.

1) DCMSServerHook.DLL 114A—The Win32 File hooks that respond to a file open command from the DCMS File Server.
2) DCMS Server Core 1102—The DCMS server core determines which plug-in to use based on information about the requested file from the DCMS database.
3) TCP 1602—TCP networking services. In the diagram, the TCP occurs over a local connection but the design allows for a remote plug-in if that was needed.
4) Database Plug-in 1604—A plug-in written to generate dynamic file data from an external database.
5) Internet Plug-in 1606—A plug-in that builds dynamic data from external FTP or web sites.
6) External Server 1610—A machine that isn't necessarily part of the DCMS that holds information necessary to building dynamic data.

In the preferred embodiment, plug-ins are implemented as TCP servers. This allows plug-ins to reside either locally or remotely with optimal performance and not rely heavily on OS dependant technologies such as COM, shared libraries, or pipes. The DCMS server core 1102 sends the virtual path name of the requested file to the plug-in and receive raw data.

Also, DCMS plug-ins that generate data from a remote database may be utilized, and a plug-in that generates data from a remote FTP or HTTP server may be utilized in the DCMS server core 1102.

In the preferred embodiment, the DCMS database is implemented using an ODBC compliant SQL Server database. At least the following types of data are included in the preferred implementation:

Usage Statistics—

File Information:
a) Virtual Path location—The file's position in the virtual file system.
b) Type—Is this a static file or a dynamically generated file?
c) "Facts"—Facts can be stored about files. These facts are used by the rule engine of the DCMS Server Core to determine how to encode the given file.

DCMSConfig is an ASP application that configures the DCMS Database. ASP and Visual Basic code provide the HTML interface.

The DCMSServerHook.DLL contains a set of hook functions that get installed in place of standard Win.32 API functions in KERNEL32.DLL. These hooks intercept file open and read commands from the standard file server and return DCMS file data.

Figure 17:
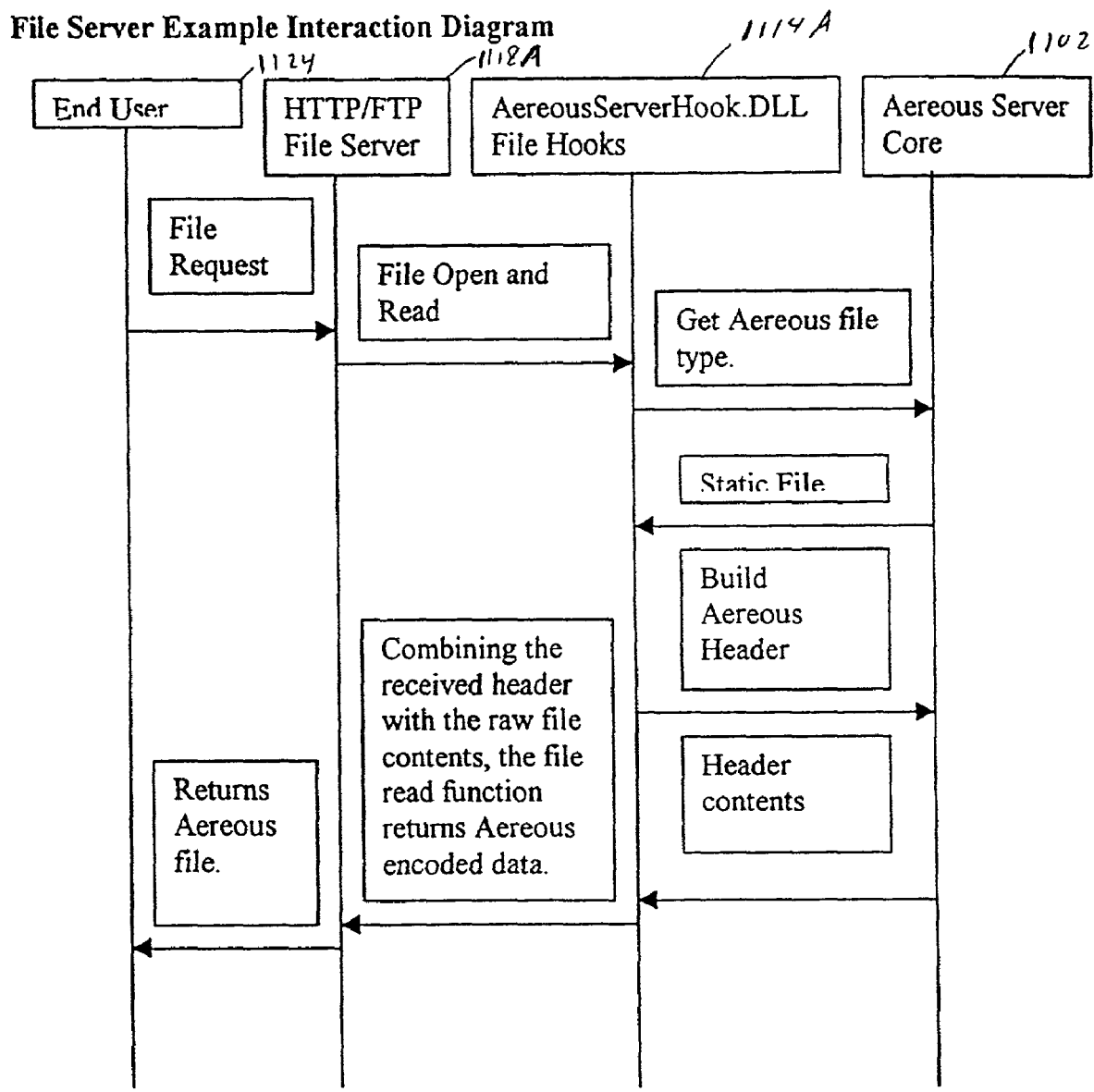
FIG. 17 is an interaction diagram that illustrates the scenario when a file server attempts to read a static DCMS virtual file, in accordance with an aspect of the invention.

The interaction diagram shown in FIG. 17 illustrates the scenario where the file server attempts to read a file that corresponds to a static DCMS virtual file.

DCMSServerHook needs certain configuration data to function properly. This data is stored in the Win32 registry. For performance reasons, DCMSServerHook does not recheck the registry for each and every file operation. In the preferred embodiment, checks are performed no more frequently than every thirty seconds.

For both performance and safety reasons, DCMSServerHook.DLL only takes action on files that reside within designated DCMS Paths. The system directory is excluded from these paths since that would cause DCMS hooks to take action, involving TCP communication, at sensitive times such as system boot up.

Registry Entries—

HKEY_LOCAL_MACHINE\Software\DCMS\ManagerAddress

An IP address in string format that indicates where DCMS Server is located.

HKEY_LOCAL_MACHINE\Software\DCMS\Disable

A boolean flag that signals DCMSServerHook.DLL to pass all Win32 API calls directly through. This allows DCMS to be temporarily turned off on a server without requiring a reboot. Under normal operation, this flag won't be present.

HKEY_LOCAL_MACHINE\Software\DCMS\NumPaths

An integer value indicating the number of DCMS Paths present.

HKEY_LOCAL_MACHINE\Software\DCMS\LocalPath
[n]
   Contains a local Win32 file path that targeted raw files may exist under.

HKEY_LOCAL_MACHINE\Software\DCMS\VirtualPath
[n]
   Maps the corresponding local path to a DCMS virtual path.

Pseudo-Code for Specific Win32 API Overrides—

CreateFile
   If disabled pass through.
   Is path in a relevant branch? If not pass through.
   Query Server. If not present or some kind of error, return error.
   If requesting write access return access denied error.
   If static file, acquire header. Open real file. Build linked list record.
   Store handle to real file and encoded header. Return real handle.
   If dynamic file, acquire entire file and then return handle. Return a file handle opened to a dummy file.

ReadFile
   If there is no session structure for the given file handle pass through. Convert from DCMS file position to real file position Build encrypted data and output. Update DCMS file position SetFilePointer
   If there is no session structure for the given file handle pass through. Get the final encoded length. This requires that the encryption block size is known beforehand. This is necessary for bounds checking and set relative to the file end calls. Update internal pointer and return. The underlying Win32 file pointer is not adjusted.

CloseHandle
   If there is no session structure for the given file handle pass through. Dispose session structure.

The DCMS ClientHook.DLL hooks deliver push content, enforce usage restrictions, and supply end user applications with the raw data from a DCMS file. Typically, these hooks are invoked when a standard end-user viewing application opens a DCMS file.

To prevent a simple file copy from producing a raw version of a DCMS file, once an application begins to read a DCMS encoded file, all subsequent file's opened for writing are written using DCMS encoding.

To reduce the number of times a DCMS file's open conditions are triggered inappropriately, these hooks wait for an actual file read rather than triggering immediately upon file open. This distinction is made since many software programs test for the presence of a file by opening and then immediately closing a file.

Pseudo-Code for Specific Win32 API Overrides—

CreateFile
   Call underlying Win32 function.
   If failed return.

ReadFile
   If there is no session structure for the given file handle pass through.
   Build raw data from the DCMS file data.
   Update the file offset.

WriteFile
   If there is no session structure for the given file handle pass through.
   If this is not a DCMS file, dispose of the session structure and pass through.
   Convert the given raw data to DCMS encoded data.
   Update the file pointer.

SetFilePointer
   If there is no session structure for the given file handle pass through.

CloseHandle
   If there is no session structure for the given file handle pass through. Dispose session structure.

As explained in detail above, the DCMS server acts as an interface between front-end web servers (e.g., Apache, IIS, Solaris, Phone.Com's WAP server, etc.) and back-end applications (e.g., Oracle, SQL, eCash, CyberCash, Reciprocal, Intertrust, etc.). The DCMS server acts as a wrapping agent, securing in real time files that pass through it.

The Core of the DCMS server is where the files are protected against unauthorized access, and where the rules and other information is included With the requested file, as a wrapped file to be eventually sent to the requesting client. The method of preventing unauthorized access is preferably accomplished with a security plug-in, such as one from Intertrust, RSA, or nTRU.

Figure 24:
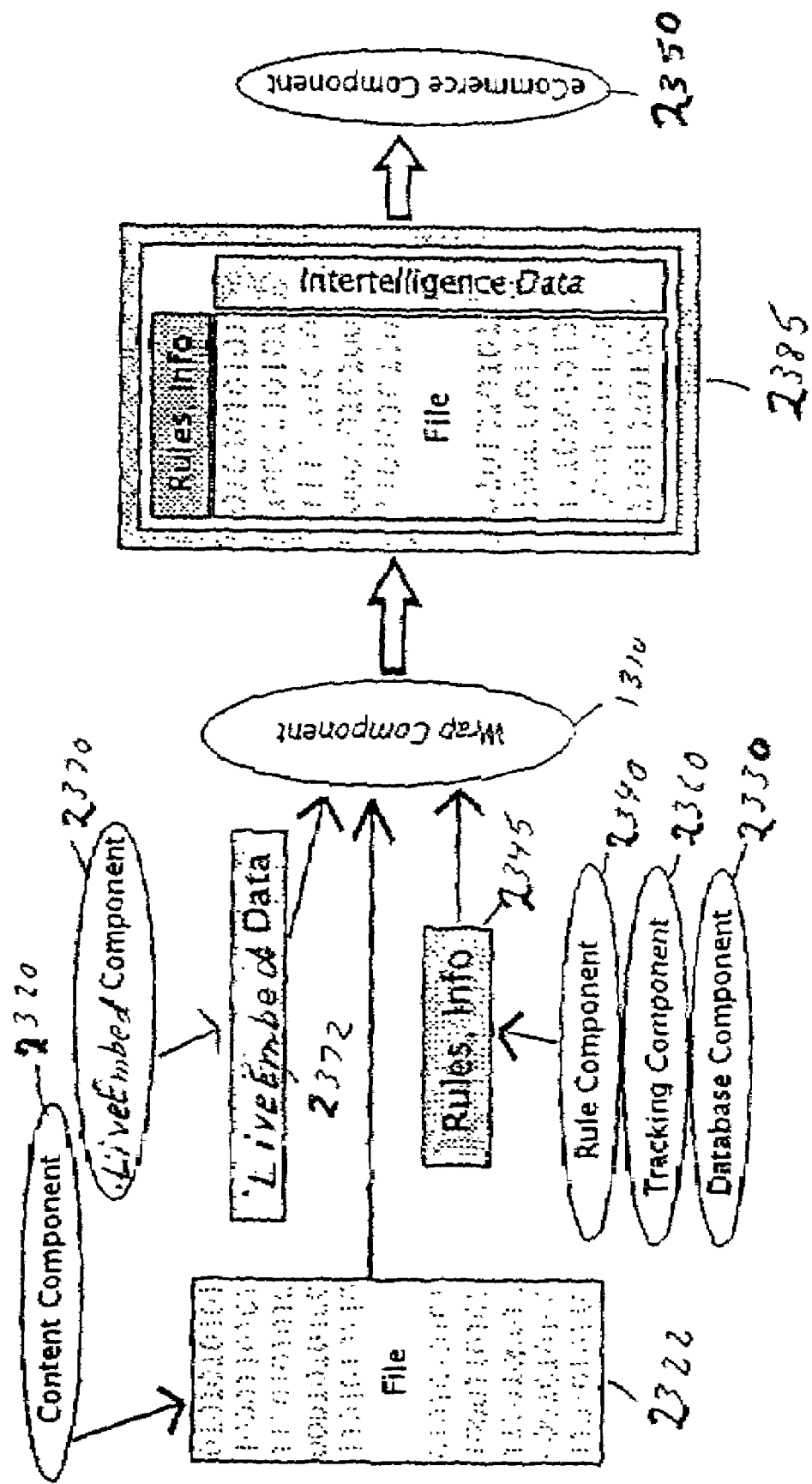
FIG. 24 shows various components of the DCMS server that are used to wrap a file.

Various components of the DCMS server will be described in detail below with reference to FIG. 24. The Database Component 2330 of the DCMS Server allows the DCMS server to access database programs. For example, the Database Component will allow for communications between 'the DCMS Server and standard ODBC databases, thereby allowing communication with a variety of off-the-shelf database programs from different vendors, such as MS SQL, Oracle, MySQL, etc.

The Rule Component 2340 of the DCMS server processes and supplies access privileges to the Wrap Component 2310 of the DCMS server. The rules, or privileges, define under what conditions that wrapped file can be accessed or utilized.

The Rule Component accesses rules form a variety of DRM companies, as well as its own rule set stored in the DCMS server. The rules may be: how many times a document can be opened, transferred (if at all), printed (if at all), etc.

The Rule Component is called by the Wrap Component that sends the FILE ID to the Rule Component. At that time, the Rule Component searches a logical location table, and delivers the appropriate rules and other information for that file to the Wrap Component. In situations where additional servers have to be accessed, the connection to those additional servers is secured and authenticated, and the rules are translated to a DCMS-processed format, and then passed to the Wrap Component to be included with the raw file data to be eventually sent to the requesting client as a wrapped file.

The source or rules can include a variety of different formats and locations, including XML files, remote servers, CGI-scripts, SQL databases, text files, and remote warehouse solution providers/software. The DCMS server application has an appropriate translator installed through the plug-in component, in order to receive and interpret information received in any of these different formats.

Rules are not required to specify any type of file protection. In fact, they can specify absolutely nothing, if the circumstances warrant. Also, rules can simply require that the file usage be tracked and/or monitored. In many cases, however, the rules specify basic restrictions on number of openings, whether or not the requested file can be transferred to another computer, and/or a time limit for which the file may be opened by the user.

The E-commerce Component 2350 of the DCMS server allows businesses to be compensated when consumers access copyrighted works on-line. The E-Commerce Component allows for businesses to select the billing/payment method they choose. Credit card, checking, custom debit, gift certificates, are some of the possible billing/payment methods that can be utilized with the E-Commerce Component.

Content authors or merchants simply select the method of billing/payment, and relay that information to the E-commerce Component.

The Tracking Component 2360 of the DCMS server allows the content distributed to track the end-user's file usage. This is applicable in a number of situations, from using a protection system that requires a persistent connection to the host and in a system where the "key" files are transferred under special circumstances, to "super-distribution" scenarios where the file is tracked as it is transferred between users.

The Tracking Component can also be utilized in streaming environments where royalties are paid on a per-stream basis. In cases like this, the files are sent through the DCMS server application and then routed through the appropriate streaming server such as Real Player™ or Quick Time™.

By interfacing the Tracking Component to many customer recommendation systems, retail actions can be tracked and compiled. This allows businesses to make intelligent recommendations based upon the user's previous choices and experiences.

The information collected by the Tracking Component is dependent on the destination applications and the amount of information that the content provider has specified to be collected. The DCMS server application does not utilize this information for its own purposes, and all information is stored in secure locations, so that this information is not misused or easily stolen.

Businesses can also use the Tracking Component to offer users in media tracking "in media tracking." When used in harmony with the LiveEmbed™ events in the files, the Tracking Component can deliver user feedback even when the media file has been deployed. Additional information can also be sent back to the DCMS server after the file has been deployed, such as file usage statistics, as defined by the content distributor.

The Plug-In Component (not shown) of the DCMS server allows authorized third-party developers to write add-ons, that harness and extend the power of the DCMS server application. The Plug-In Component allows the developers to make a limited number of system-level calls, and opens most of the Application services calls to developer manipulation. Special attention is given to prevent any access to the low level of the Wrap Component, thus preventing unauthorized access and/or manipulation of the security features of the DCMS system.

The Plug-In Component may be provided in a manner similar to that of the Adobe, Inc. Plug-In concept. At the time that the DCMS server application is booted, a specified file path is checked. If there are Plug-Ins available, then the DCMS server application loads these plug-ins, and continues booting. The API calls for interaction with the DCMS server application are not platform-specific. However, if a developer utilizes any calls in their Plug-in, then platform-specific compiled plug-ins will be required.

The Scripting Component (not shown) of the DCMS server interfaces with a wide variety of different server technologies. The Scripting Component is preferably compatible, but other scripting languages may be utilized, such as Java/Java Script or ASP, for example.

Figure 19:
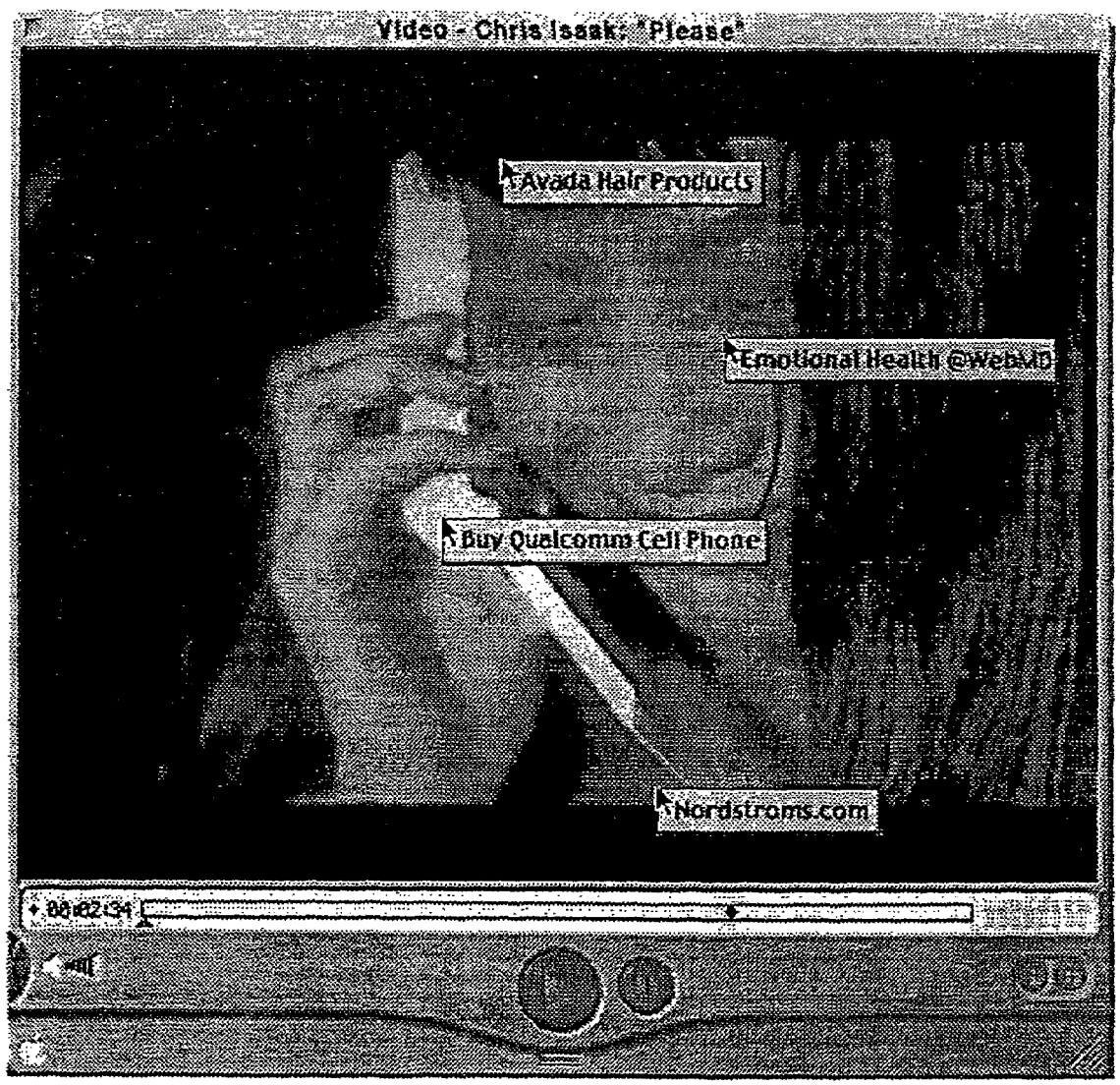
FIG. 19 shows various embedded elements that are provided to a user along with a requested file, by way of the LiveEmbed™ component, in accordance with an aspect of the invention.

The LiveEmbed™ Component 2370 of the DCMS server allows special events to be embedded in media files when the file passes through the DCMS server application. This allows companies to attach value-added information to a special track in the file. When the consumer accesses the file, they have the option to view and interact with the embedded events. FIG. 19 shows various embedded events that a user may select when he/she has downloaded a Chris Isaac music track using the DCMS. The user can click on the phone shown on the display in order to go to a web site to purchase cell phones; the user can click on the person's face on the display to go to a web site that provides information on health matters; and the user can click on the person's hair on the display to go to a web site that sells hair products, for example.

Referring again to FIG. 24, the LiveEmbed™ data 1372 used by the LiveEmbed™ Component is preferably based on a custom subset of the XML data standard, allowing many programs to create these events, and remove any potential learning curve just to add the LiveEmbed™ events to a file.

The LiveEmbed™ data is added to the file by the DCMS server application on-the-fly. This allows for end-user-specific information to be added to the file, creating an individual and unique user experience.

When the end-user accesses the file, he/she can right click or option-click to access the retail information events. The XML data is stripped from the file and interpreted by the DCMS client application located on the end-user's machine. When the information is accessed, the appropriate Internet servers are, accessed and the associated events are performed. The deep system embedding of the plug-in and the right-click/option-click features allow the end-user a quality, unintimidating experience.

The XML data can be either event-based on time-based. The event-based data is best suited for text and other static data, and the time-based data is best suited for audio, video and presentations.

The XML data can be authored in a normal text/html editor and applied at the time the file is wrapped by the DCMS Server Core. Alternatively, the author can utilize one of the integrated production environments that natively support the LiveEmbed™ Component. This choice gives the content authors the utmost control over the presentation of, and interaction with, their product.

All of the above-described components of the DCMS server are implemented in software, in the preferred embodiment.

The configuration features of the DCMS server application is two-pronged. The first prong is the configuration of the individual content files, with their rule data. The second prong is the configuration of the actual server application.

With respect to the configuration of the actual server application, in the preferred embodiment, there are five levels of access that can be granted to the DCMS server application: master administrator, connection administrator, content administrator, end-user access, end-user viewing. These five levels allow for differing specializing with regard to access to the DCMS server application. The master administrator assigns user privileges based on an access/rights-based system. For example, an individual may be granted access to a Content Admin. account to upload, and set rules for, files.

The Variable Data Pipeline (VDP) Component of the DCMS server is provided to seamlessly improve the end-user's media delivery experience using the DCMS. The VDP Component continually and automatically detects the connection speed of an end-user's device, and delivers a suitably compressed file for the available amount of bandwidth.

While Apple, Microsoft and Real Networks implement a feature in their media playback programs, the user must pre-define their connection speed and it cannot be manipulated in real-time. The VDP Component of the DCMS server allows the delivery characteristics of the actual media file to be changed on-the-fly.

The VDP Component uses a ping command that issues IP packets (each of these values can be set by the user). FIG. 20 shows information that is obtained from two packets that are used to determine channel characteristics between the client and the DCMS server. The returned data latency times are examined by the VDP Component, in order to establish an average latency time. The average data request rate and through-put are analyzed in conjunction with the latency times. The end result is a data pipeline size rating. This classifies the quality and sustainable throughput of the connection. If a range of files, designed for different bandwidths, have been created and specified, then the DCMS server application maintain the delivery of the optimum file. Should the connection rate increase or decrease, then the file delivered will change, on-the-fly.

The Variable Data Pipeline features of the invention will now be described in greater detail. Once a change in the available end-user bandwidth is detected, the corresponding files are manipulated. This means that should different files be available for different bandwidths, they have to be readied, then seamlessly delivered to the end-user. In the case of audio and video, the user may not be able to detect the change (no "hiccup"). In cases where other types of data are delivered (such as application service providing), there is error correction in place to prevent-any errors from being introduced. The seamless switch between one file to another is accomplished by two algorithms that coordinate and sync-up the two files.

The file that is currently being delivered (currently-delivered file) is stopped in synchronization with the beginning of the delivery of the replacement file. This is accomplished on the file that is currently being delivered by calculating the position in the file where the two can be seamlessly switched. To determine that point in the currently being delivered file, a forward looking algorithm determines the closest available IP frame, based upon the currently delivery speed and latency. This point in the file is factored with any exogenous file factors such as frame rate (in the case of video files) or sampling rate (in the case of audio files). The resulting file location is passed on to the second algorithm that is determining the switch-over location in the replacement file.

The replacement file, which is the file to replace the file currently being delivered, is specified in an administrator-defined preference file. The location where the file is to pick-up is determined by the location passed to the algorithm by the currently delivered file, then file specific factors are calculated such as frame rate (in the case of video files) or sampling rate (in the case of audio files). The resulting information determines where in the file the switch will occur.

When the two key locations in the two files are determined, they are both buffered, and the switch occurs, with the aid of tight error correction. To the end-user, little has changed. In the cases of audio and video, there might be a change in compression, and thus quality. The shift, however, takes place without any appreciable loss of continuity.

Another feature of the Variable Data Pipeline is the scalable architecture that allows it to serve as a powerful bandwidth allocator and moderator. This feature set utilizes advanced router mapping/tracing and real-time interfacing with bandwidth commodity sellers and exchanges.

In the course of determining the latency and bandwidth information, certain network characteristics are also gathered. These data points can be used to determine the most economical ways to transport data around the world. By connecting with bandwidth resellers, the DCMS Server Application can make intelligent data 1/0 decisions based upon administrator-enabled rules. Depending on the time need nature of the data, it can even be cached and managed by the DCMS Server Application and then sent when there are lulls and/or off-peek rate times over international backbones. This can save the transmitter of the data a considerable amount of money, while still providing of exceptional quality of service.

This technology is especially attractive to companies who utilize content delivery acceleration technologies and services. These solutions include caching and distributed servers. By defining the delivery rules of content that has been wrapped, companies can use caching and distributed servers and still have the protection of the DCMS Server Application.

The DCMS Server Application is capable of creating and distributing the files, to caching and content systems around the world, through the best or most economical paths. This eliminates one of the major networking concerns with real-time applications: latency.

The DCMS Server Application can also use the Variable Data Pipeline features to communicate and accent technologies like those from Akamai. Multiple DCMS Servers can be positioned in key, strategic world-wide positions, creating an intelligent distributed network of DCMS Servers that further reduce transmission costs and latency.

FIG. 21 shows the header structure of a DCMS file, in accordance with an aspect of the invention. The header structure is provided in a header, with the accompanying data to be provided thereafter in a data packet.

Figure 22:
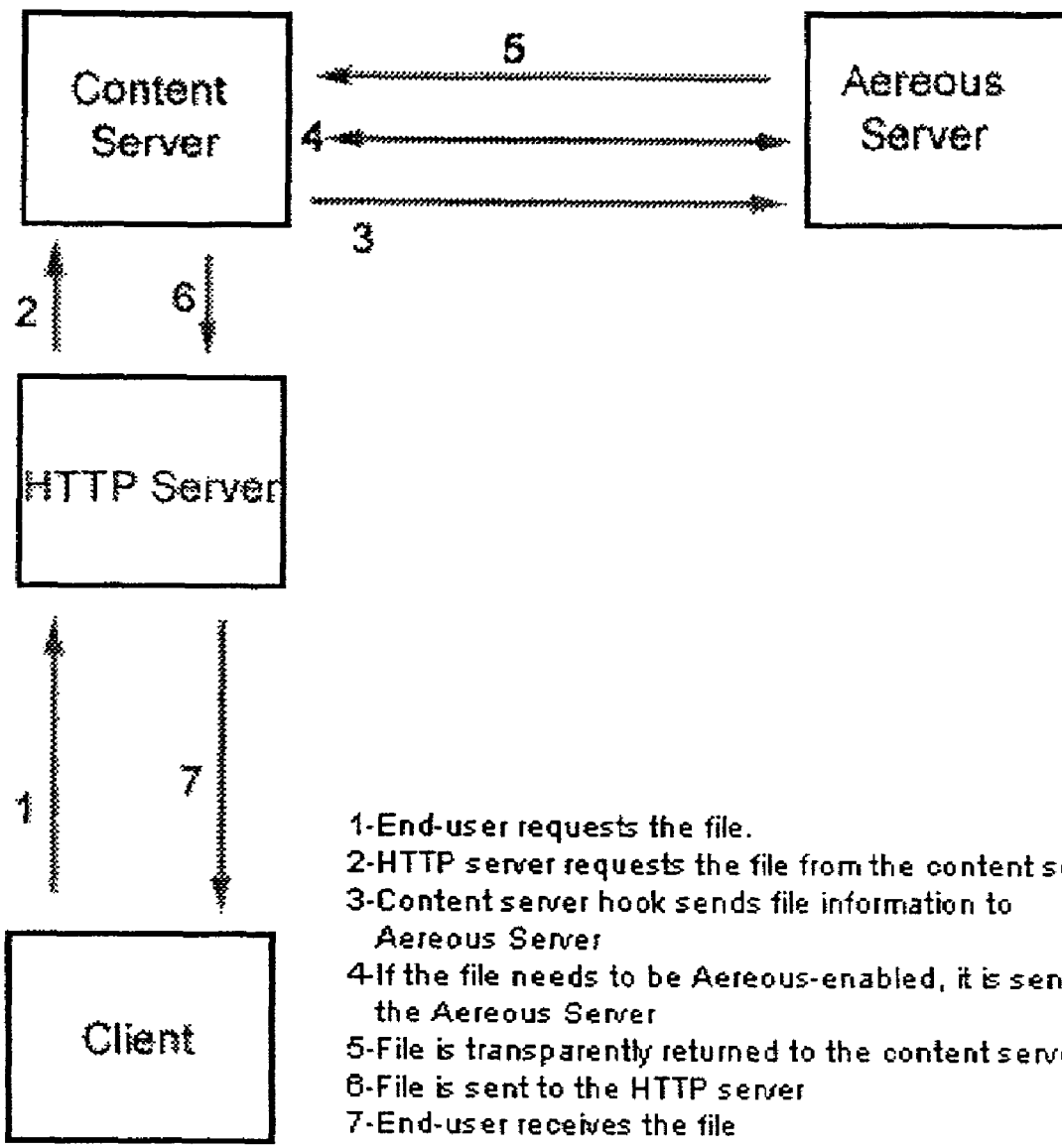
FIG. 22 shows the flow of information among a client, a DCMS Server and a Content Server, in accordance with the invention.

FIG. 22 shows the flow of information among a client, a DCMS Server and a Content Server, in accordance with the invention. An end-user (or client) requests a file. An HTTP server receives that request, and requests the file from the Content Server. The Content Server hook (an application extension at the Content Server) sends file information to the DCMS Server, based on the request being received at the Content Server, where that request is determined to be for data to be wrapped. The requested file is wrapped by the DCMS Server, and the wrapped file is transparently returned to the Content Server. The wrapped file is then sent by the Content Server to the HTTP Server, and the end-user receives the requested file, in wrapped form, from the HTTP Server.

FIG. 23 shows one example of a Virtual File table that holds data utilized by the DCMS Server to access information from various Content Servers, in accordance with the invention.

Figure 25:
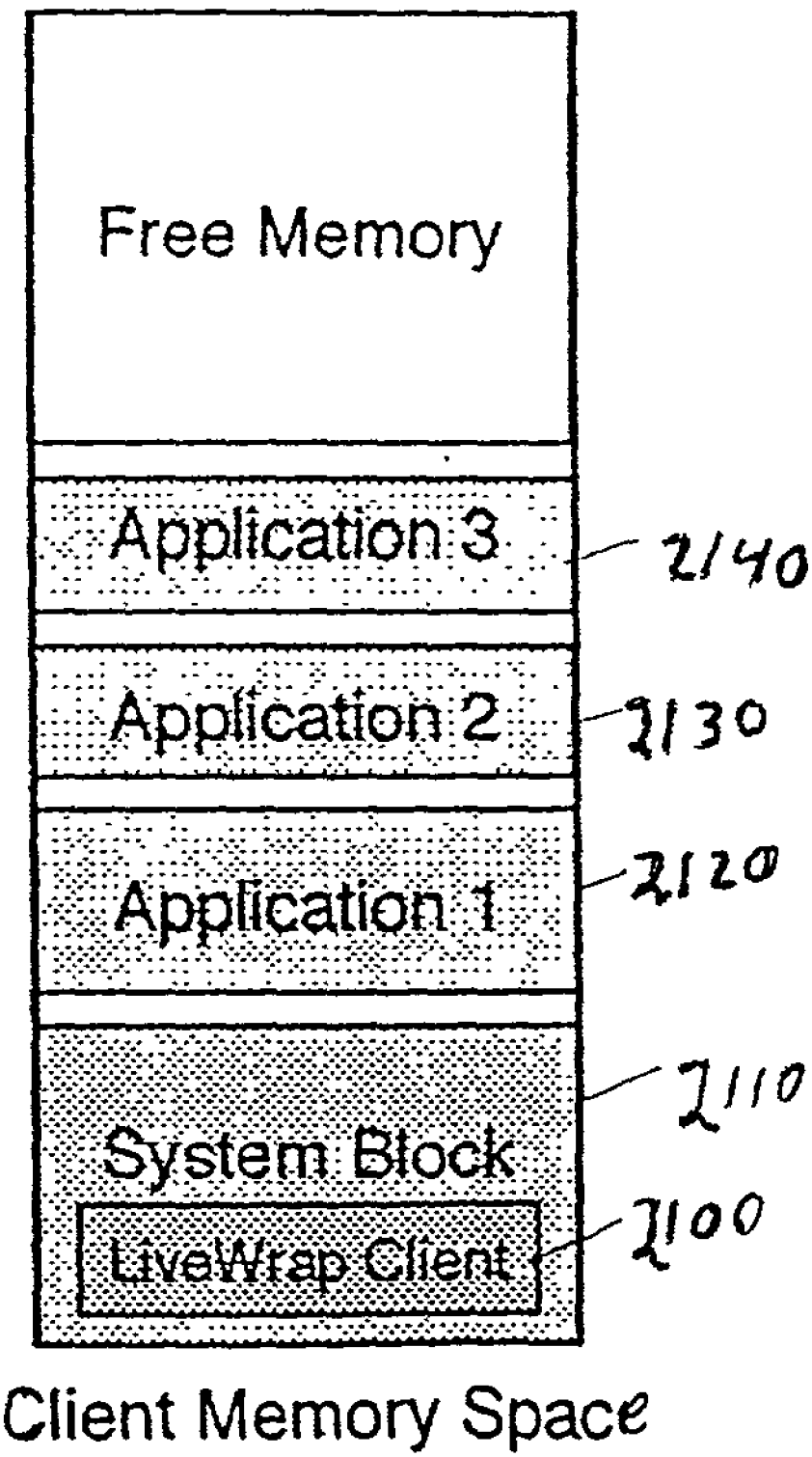
FIG. 25 shows the DCMS client application stored in a host operating system's memory partition of a client computer, in accordance with an aspect of the invention.

FIG. 25 shows the DCMS client application being stored in the host Operating System's memory partition in the client computer. The DCMS client software 2100 is stored in the system block 2110, separate from where other applications (Application #1 2120, Application #2 2130, Application #3 2140) are stored. This, in effect, creates an OS extension-like program.

Positioning the DCMS client application in the System heap at the client computer allows it to operate without interfering with the end-user's normal activities. The ability to "hack" the DCMS client application also becomes very difficult due to the storage of the DCMS client application in the System heap, since there is no convenient way for a hacker to tell where in the computer (or embedded device) memory the DCMS client application is stored.

While the present invention has been described above with respect to the preferred embodiments, other modifications may be made, while keeping within the spirit and scope of the invention as defined in the following claims. For example, while the client application has been described as operating mainly upon reception of a file at the client computer, there may be instances in which the client application engages in a brief communication with the DCMS server, before the file is transferred. Such an instance would be a permission-based request for a user's demographic information, which would-occur inside a web browser, but would be routed to the DCMS server. Such information provided to the DCMS server would then be used by the LiveEmbed™ component, for example, for wrapping links to potentially interesting web sites and BMPs with the requested file, based on the user's supplied information.

The invention may be embodied in other specific forms without departing from the spirit or central characteristics thereof. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A method performed by a proxy server, the method comprising:
   receiving, over a first network connection, a Network File System (NFS) based request from a client machine for a data block of a data file from a remote network attached storage system, the request having an associated user, the data block having a fixed preconfigured size associated with the data file;
   requesting, from an authentication server, an access policy associated with the associated user;
   receiving, from the authentication server, the access policy associated with the associated user;
   determining, from the access policy associated with the associated user and metadata associated with the data file, the metadata being stored on the remote network attached storage system, if the associated user has the authority to access the data file; and
   if the associated user has the authority to access the data file, then:
      establishing a set of usage rights based on the access policy associated with the associated user and the metadata associated with the data file;
      requesting, over a second network connection, from the network attached storage system, the data block of the data file;
      receiving, over the second network connection, from the network attached storage system, the data block of the data file;
      encrypting the received data block, such that only an authorized client module executing on the client machine by the associated user can decrypt the encrypted received data block;
      encapsulating within a packet:
         the encrypted received data block; and
         the established set of usage rights; and
      sending, over a secure channel, the packet to the client machine such that only the authorized client module can access the encrypted received data block and only when such access is in accordance with the established set of usage rights, said authorized client module running transparently to the associated user, logically interposed between an application layer and an operating system kernel layer.

2. A method as in claim 1 wherein the established set of usage rights includes one or more access restrictions, each usage restriction including:
   a restriction type; and
   a set of parameters associated with the restriction type.

3. A method as in claim 2 wherein the restriction type indicates that data from the encrypted received data block may only be e-mailed to recipients listed within the set of parameters.

4. A method as in claim 1 wherein the access policy associated with the associated user includes a set of access conditions, each access condition including:
   a condition type; and
   a set of parameters associated with the condition type.

5. A method as in claim 4 wherein the condition type indicates that the associated user only has the authority to access the data file when a clock time falls between a first value listed in a first parameter of the set of parameters and a second value listed in a second parameter of the set of parameters.

6. The method of claim 1, wherein said data file includes static content.

7. The method of claim 1, wherein said data file includes dynamic content.

8. The method of claim 1, wherein said encrypting said received data block is performed as a function of a shared session secret shared between said proxy server and said client machine.

9. The method of claim 1, wherein said proxy server includes a user interface and the method further includes creating and/or editing said access policy and associating said access policy with said data file using said user interface.

10. The method of claim 1 wherein the method further comprises:
    encrypting each data block of the data file independently, using a unique initialization vector for each data block and one or more encryption/decryption keys; and
    communicating said one or more encryption/decryption keys to said client machine.

11. A proxy server, comprising:
    processing circuitry; and
    network communications circuitry;
    the processing circuitry and network communications circuitry being operative together to perform a method including:
       receiving, over a first network connection, a Network File System (NFS) based request from a client machine for a data block of a data file from a remote network attached storage system, the request having an associated user, the data block having a fixed preconfigured size associated with the data file;
       requesting, from an authentication server, an access policy associated with the associated user;
       receiving, from the authentication server, the access policy associated with the associated user;
       determining, from the access policy associated with the associated user and metadata associated with the data file, the metadata being stored on the remote network attached storage system, if the associated user has the authority to access the data file; and
       if the associated user has the authority to access the data file, then:
          establishing a set of usage rights based on the access policy associated with the associated user and the metadata associated with the data file;
          requesting, over a second network connection, from the network attached storage system, the data block of the data file;

receiving, over the second network connection, from the network attached storage system, the data block of the data file;

encrypting the received data block, such that only an authorized client module executing on the client machine by the associated user can decrypt the encrypted received data block;

encapsulating within a packet:
   the encrypted received data block; and
   the established set of usage rights; and sending, over a secure channel, the packet to the client machine such that only the authorized client module can access the encrypted received data block and only when such access is in accordance with the established set of usage rights, said authorized client module running transparently to the associated user, logically interposed between an application layer and an operating system kernel layer.

12. A proxy server as in claim 11 wherein the established set of usage rights includes one or more access restrictions, each usage restriction including:
   a restriction type; and
   a set of parameters associated with the restriction type.

13. A proxy server as in claim 12 wherein the restriction type indicates that data from the encrypted received data block may only be e-mailed to recipients listed within the set of parameters.

14. A proxy server as in claim 11 wherein the access policy associated with the associated user includes a set of access conditions, each access condition including:
   a condition type; and
   a set of parameters associated with the condition type.

15. A proxy server as in claim 14 wherein the condition type indicates that the associated user only has the authority to access the data file when a clock time falls between a first value listed in a first parameter of the set of parameters and a second value listed in a second parameter of the set of parameters.

16. The proxy server according to claim 11, wherein said data file includes static content.

17. The proxy server according to claim 11, wherein said data file includes dynamic content.

18. The proxy server according to claim 11, wherein said encrypting said received data block is performed as a function of a shared session secret shared between said proxy server and said client machine.

19. The proxy server according to claim 11, wherein said proxy server further includes a user interface, configured to facilitate creation and editing of said access policy and association of said access policy with said data file.

20. The proxy server according to claim 11:
   wherein each data block of the data file is encrypted independently, using a unique initialization vector for each data block and one or more encryption/decryption keys; and
   wherein the one or more encryption/decryption keys are also provided to said client machine.

* * * * *

UNITED STATES PATENT AND TRADEMARK OFFICE
CERTIFICATE OF CORRECTION

PATENT NO. : 7,660,902 B2  Page 1 of 1
APPLICATION NO. : 09/989479
DATED : February 9, 2010
INVENTOR(S) : Graham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this

Thirtieth Day of November, 2010

David J. Kappos
*Director of the United States Patent and Trademark Office*